United States Patent
Millington

(10) Patent No.: US 9,734,242 B2
(45) Date of Patent: *Aug. 15, 2017

(54) SYSTEMS AND METHODS FOR SYNCHRONIZING OPERATIONS AMONG A PLURALITY OF INDEPENDENTLY CLOCKED DIGITAL DATA PROCESSING DEVICES THAT INDEPENDENTLY SOURCE DIGITAL DATA

(71) Applicant: Sonos, Inc., Santa Barbara, CA (US)

(72) Inventor: Nicholas A. J. Millington, Santa Barbara, CA (US)

(73) Assignee: Sonos, Inc., Santa Barbara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/290,493

(22) Filed: May 29, 2014

(65) Prior Publication Data

US 2014/0277655 A1 Sep. 18, 2014

Related U.S. Application Data

(63) Continuation of application No. 13/827,653, filed on Mar. 14, 2013, now Pat. No. 8,775,546, which is a
(Continued)

(51) Int. Cl.
*G06F 17/30* (2006.01)
*H04N 21/242* (2011.01)
(Continued)

(52) U.S. Cl.
CPC .......... *G06F 17/3074* (2013.01); *G06F 17/00* (2013.01); *H04L 65/4084* (2013.01);
(Continued)

(58) Field of Classification Search
CPC .. G06F 17/3074; G06F 1/14; G06F 17/30902; G06F 17/00; G06F 1/04;
(Continued)

(56) References Cited

U.S. PATENT DOCUMENTS 3,956,591 A   5/1976 Gates, Jr.
4,105,974 A   8/1978 Rogers
(Continued)

FOREIGN PATENT DOCUMENTS

CA   2320451 A1   3/2001
CN   1598767 A    3/2005
(Continued)

OTHER PUBLICATIONS

United Patent and Trademark Office, "Non-Final Office action", issued in connection with U.S. Appl. No. 13/827,653, mailed on Dec. 5, 2013, 49 pages.
(Continued)

*Primary Examiner* — Kostas Katsikis
(74) *Attorney, Agent, or Firm* — McDonnell, Boehnen, Hulbert & Berghoff LLP

(57) ABSTRACT

In a system for distributing data, distribution device is configured to distribute timestamp, offset and source location information for a digital data stream to an execution device, and the execution device is configured to seek digital data corresponding to the received information. The execution device is further configured to execute the digital data relative to a clock rate maintained by the distribution device. Related methods include receiving timestamp, offset and source location information for the digital data stream and seeking digital data corresponding to the received offset and source location information.

20 Claims, 2 Drawing Sheets

Related U.S. Application Data continuation of application No. 13/298,090, filed on Nov. 16, 2011, now Pat. No. 8,423,659, which is a continuation of application No. 11/906,702, filed on Oct. 2, 2007, now Pat. No. 8,086,752, application No. 14/290,493, which is a continuation of application No. 11/801,468, filed on May 9, 2007, now Pat. No. 8,020,023, which is a continuation-in-part of application No. 10/816,217, filed on Apr. 1, 2004, now Pat. No. 8,234,395.

(60) Provisional application No. 60/876,455, filed on Dec. 20, 2006, provisional application No. 60/860,964, filed on Nov. 22, 2006, provisional application No. 60/490,768, filed on Jul. 28, 2003.

(51) Int. Cl.
| | |
|---|---|
| H04N 21/43 | (2011.01) |
| H04N 21/6332 | (2011.01) |
| H04N 21/654 | (2011.01) |
| H04N 21/6547 | (2011.01) |
| H04N 21/81 | (2011.01) |
| G06F 17/00 | (2006.01) |
| H04L 29/06 | (2006.01) |

(52) U.S. Cl.
CPC ....... H04N 21/242 (2013.01); H04N 21/4307 (2013.01); H04N 21/6332 (2013.01); H04N 21/654 (2013.01); H04N 21/6547 (2013.01); H04N 21/8106 (2013.01)

(58) Field of Classification Search
CPC .............. G06F 1/10; G06F 17/30781; G06F 17/30017; G06F 17/30; H04L 29/0854; H04L 29/08072; H04L 29/06; H04L 29/0809; H04L 29/08549; H04L 29/08144; H04L 65/4084; H04N 21/8106; H04N 21/6547; H04N 21/654; H04N 21/6332; H04N 21/4307; H04N 21/242
USPC ................... 700/94; 709/213, 248; 381/300
See application file for complete search history.

(56) References Cited

U.S. PATENT DOCUMENTS

| | | |
|---|---|---|
| D260,764 S | 9/1981 | Castagna et al. |
| 4,296,278 A | 10/1981 | Cullison et al. |
| 4,306,114 A | 12/1981 | Callahan |
| 4,509,211 A | 4/1985 | Robbins |
| D279,779 S | 7/1985 | Taylor |
| 4,530,091 A | 7/1985 | Crockett |
| 4,696,037 A | 9/1987 | Fierens |
| 4,701,629 A | 10/1987 | Citroen |
| 4,712,105 A | 12/1987 | Kohler |
| D293,671 S | 1/1988 | Beaumont |
| 4,731,814 A | 3/1988 | Becker et al. |
| 4,816,989 A | 3/1989 | Finn et al. |
| 4,824,059 A | 4/1989 | Butler |
| D301,037 S | 5/1989 | Matsuda |
| 4,845,751 A | 7/1989 | Schwab |
| D304,443 S | 11/1989 | Grinyer et al. |
| D313,023 S | 12/1990 | Kolenda et al. |
| D313,398 S | 1/1991 | Gilchrist |
| D313,600 S | 1/1991 | Weber |
| 4,994,908 A | 2/1991 | Kuban et al. |
| D320,598 S | 10/1991 | Auerbach et al. |
| D322,609 S | 12/1991 | Patton |
| 5,086,385 A | 2/1992 | Launey et al. |
| D326,450 S | 5/1992 | Watanabe |
| D327,060 S | 6/1992 | Wachob et al. |
| 5,151,922 A | 9/1992 | Weiss |
| 5,153,579 A | 10/1992 | Fisch et al. |
| D331,388 S | 12/1992 | Dahnert et al. |
| 5,182,552 A | 1/1993 | Paynting |
| D333,135 S | 2/1993 | Wachob et al. |
| 5,185,680 A | 2/1993 | Kakubo |
| 5,198,603 A | 3/1993 | Nishikawa et al. |
| 5,237,327 A | 8/1993 | Saitoh et al. |
| 5,239,458 A | 8/1993 | Susuki |
| 5,272,757 A | 12/1993 | Scofield et al. |
| 5,299,266 A | 3/1994 | Lumsden |
| D350,531 S | 9/1994 | Tsuji |
| D350,962 S | 9/1994 | Reardon et al. |
| 5,361,381 A | 11/1994 | Short |
| 5,372,441 A | 12/1994 | Louis |
| D354,059 S | 1/1995 | Hendricks |
| D354,751 S | 1/1995 | Hersh et al. |
| D356,093 S | 3/1995 | McCauley et al. |
| D356,312 S | 3/1995 | Althans |
| D357,024 S | 4/1995 | Tokiyama et al. |
| 5,406,634 A | 4/1995 | Anderson et al. |
| 5,430,485 A | 7/1995 | Lankford et al. |
| 5,440,644 A | 8/1995 | Farinelli et al. |
| D362,446 S | 9/1995 | Gasiorek et al. |
| 5,457,448 A | 10/1995 | Totsuka et al. |
| D363,933 S | 11/1995 | Starck |
| 5,467,342 A | 11/1995 | Logston et al. |
| D364,877 S | 12/1995 | Tokiyama et al. |
| D364,878 S | 12/1995 | Green et al. |
| D365,102 S | 12/1995 | Gioscia |
| D366,044 S | 1/1996 | Hara et al. |
| 5,481,251 A | 1/1996 | Buys et al. |
| 5,491,839 A | 2/1996 | Schotz |
| 5,515,345 A | 5/1996 | Barreira et al. |
| 5,533,021 A * | 7/1996 | Branstad ........ H04N 21/23431 348/464 |
| D372,716 S | 8/1996 | Thorne |
| 5,553,147 A | 9/1996 | Pineau |
| 5,553,222 A | 9/1996 | Milne et al. |
| 5,553,314 A | 9/1996 | Grube et al. |
| D377,651 S | 1/1997 | Biasotti et al. |
| 5,596,696 A | 1/1997 | Tindell et al. |
| 5,602,992 A | 2/1997 | Danneels |
| 5,623,483 A * | 4/1997 | Agrawal ............... H04J 3/0632 370/253 |
| 5,625,350 A | 4/1997 | Fukatsu et al. |
| 5,633,871 A * | 5/1997 | Bloks ..................... H04J 3/247 370/471 |
| D379,816 S | 6/1997 | Laituri et al. |
| 5,640,388 A | 6/1997 | Woodhead et al. |
| D380,752 S | 7/1997 | Hanson |
| 5,652,749 A * | 7/1997 | Davenport ......... H04N 21/2381 348/464 |
| D382,271 S | 8/1997 | Akwiwu |
| 5,661,665 A | 8/1997 | Glass et al. |
| 5,661,728 A * | 8/1997 | Finotello .............. H04N 21/235 348/512 |
| 5,668,884 A | 9/1997 | Clair et al. |
| 5,673,323 A | 9/1997 | Schotz et al. |
| D384,940 S | 10/1997 | Kono et al. |
| D387,352 S | 12/1997 | Kaneko et al. |
| 5,696,896 A | 12/1997 | Badovinatz et al. |
| D388,792 S | 1/1998 | Nykerk |
| D389,143 S | 1/1998 | Wicks |
| D392,641 S | 3/1998 | Fenner |
| 5,726,989 A * | 3/1998 | Dokic .................... G06T 9/007 370/509 |
| D393,628 S | 4/1998 | Ledbetter et al. |
| 5,740,235 A | 4/1998 | Lester et al. |
| 5,742,623 A | 4/1998 | Nuber et al. |
| D394,659 S | 5/1998 | Biasotti et al. |
| 5,751,819 A | 5/1998 | Dorrough |
| 5,761,320 A | 6/1998 | Farinelli et al. |
| 5,774,016 A | 6/1998 | Ketterer |
| D395,889 S | 7/1998 | Gerba et al. |
| 5,787,249 A | 7/1998 | Badovinatz et al. |
| 5,790,543 A | 8/1998 | Cloutier |
| D397,996 S | 9/1998 | Smith |
| 5,808,662 A | 9/1998 | Kinney |
| 5,812,201 A | 9/1998 | Yoo |

(56) References Cited

U.S. PATENT DOCUMENTS

| | | | |
|---|---|---|---|
| 5,815,689 A | 9/1998 | Shaw et al. | |
| 5,818,948 A | 10/1998 | Gulick | |
| D401,587 S | 11/1998 | Rudolph | |
| 5,832,024 A | 11/1998 | Schotz et al. | |
| 5,838,909 A | 11/1998 | Roy et al. | |
| 5,848,152 A | 12/1998 | Slipy et al. | |
| 5,852,722 A | 12/1998 | Hamilton | |
| D404,741 S | 1/1999 | Schumaker et al. | |
| D405,071 S | 2/1999 | Gambaro | |
| 5,867,691 A | 2/1999 | Shiraishi | |
| 5,875,233 A | 2/1999 | Cox | |
| 5,875,354 A | 2/1999 | Charlton et al. | |
| D406,847 S | 3/1999 | Gerba et al. | |
| D407,071 S | 3/1999 | Keating | |
| 5,887,143 A * | 3/1999 | Saito | G06F 8/458 709/200 |
| 5,905,768 A | 5/1999 | Maturi et al. | |
| D410,927 S | 6/1999 | Yamagishi | |
| 5,917,830 A * | 6/1999 | Chen | H04N 7/165 348/473 |
| D412,337 S | 7/1999 | Hamano | |
| 5,923,869 A | 7/1999 | Kashiwagi et al. | |
| 5,923,902 A | 7/1999 | Inagaki | |
| 5,946,343 A * | 8/1999 | Schotz | H04B 1/04 375/141 |
| 5,956,025 A | 9/1999 | Goulden et al. | |
| 5,956,088 A * | 9/1999 | Shen | H04N 21/2365 370/477 |
| 5,960,006 A | 9/1999 | Maturi et al. | |
| D415,496 S | 10/1999 | Gerba et al. | |
| D416,021 S | 11/1999 | Godette et al. | |
| 5,984,512 A | 11/1999 | Jones et al. | |
| 5,987,611 A | 11/1999 | Freund | |
| 5,990,884 A | 11/1999 | Douma et al. | |
| 5,991,307 A | 11/1999 | Komuro et al. | |
| 5,999,906 A | 12/1999 | Mercs et al. | |
| 6,009,457 A * | 12/1999 | Moller | G10H 1/0058 709/203 |
| 6,018,376 A | 1/2000 | Nakatani | |
| D420,006 S | 2/2000 | Tonino | |
| 6,026,150 A | 2/2000 | Frank et al. | |
| 6,029,196 A | 2/2000 | Lenz | |
| 6,031,818 A | 2/2000 | Lo et al. | |
| 6,032,202 A | 2/2000 | Lea et al. | |
| 6,038,614 A | 3/2000 | Chan et al. | |
| 6,046,550 A | 4/2000 | Ference et al. | |
| 6,061,457 A | 5/2000 | Stockhamer | |
| 6,078,725 A * | 6/2000 | Tanaka | H04N 21/2368 348/515 |
| 6,081,266 A | 6/2000 | Sciammarella | |
| 6,088,063 A | 7/2000 | Shiba | |
| D429,246 S | 8/2000 | Holma | |
| D430,143 S | 8/2000 | Renk | |
| 6,101,195 A | 8/2000 | Lyons et al. | |
| 6,108,485 A | 8/2000 | Kim | |
| 6,108,686 A | 8/2000 | Williams | |
| 6,122,668 A * | 9/2000 | Teng et al. | 709/231 |
| D431,552 S | 10/2000 | Backs et al. | |
| D432,525 S | 10/2000 | Beecroft | |
| 6,127,941 A | 10/2000 | Van Ryzin | |
| 6,128,318 A | 10/2000 | Sato | |
| 6,148,205 A | 11/2000 | Cotton | |
| 6,154,772 A * | 11/2000 | Dunn | H04M 11/062 725/109 |
| 6,157,957 A | 12/2000 | Berthaud | |
| 6,163,647 A * | 12/2000 | Terashima | H04N 9/8042 386/201 |
| 6,169,725 B1 | 1/2001 | Gibbs et al. | |
| 6,175,872 B1 | 1/2001 | Neumann et al. | |
| 6,181,383 B1 | 1/2001 | Fox et al. | |
| 6,185,737 B1 | 2/2001 | Northcutt et al. | |
| 6,195,435 B1 | 2/2001 | Kitamura | |
| 6,195,436 B1 | 2/2001 | Scibora et al. | |
| 6,199,169 B1 | 3/2001 | Voth | |
| 6,212,282 B1 | 4/2001 | Mershon | |
| 6,246,701 B1 | 6/2001 | Slattery | |
| 6,253,293 B1 * | 6/2001 | Rao | G10L 19/16 700/94 |
| D444,475 S | 7/2001 | Levey et al. | |
| 6,255,961 B1 | 7/2001 | Van Ryzin et al. | |
| 6,256,554 B1 | 7/2001 | Dilorenzo | |
| 6,269,406 B1 | 7/2001 | Dutcher et al. | |
| 6,301,012 B1 | 10/2001 | White et al. | |
| 6,308,207 B1 | 10/2001 | Tseng | |
| 6,310,652 B1 | 10/2001 | Li et al. | |
| 6,313,879 B1 | 11/2001 | Kubo et al. | |
| 6,321,252 B1 | 11/2001 | Bhola et al. | |
| 6,324,586 B1 | 11/2001 | Johnson | |
| D452,520 S | 12/2001 | Gotham et al. | |
| 6,332,147 B1 | 12/2001 | Moran et al. | |
| 6,343,028 B1 | 1/2002 | Kuwaoka | |
| 6,349,285 B1 * | 2/2002 | Liu | H04S 3/00 704/500 |
| 6,349,339 B1 | 2/2002 | Williams | |
| 6,351,821 B1 | 2/2002 | Voth | |
| 6,353,172 B1 | 3/2002 | Fay et al. | |
| 6,356,871 B1 | 3/2002 | Hemkumar et al. | |
| 6,404,811 B1 | 6/2002 | Cvetko et al. | |
| 6,418,150 B1 | 7/2002 | Staats | |
| 6,430,353 B1 | 8/2002 | Honda et al. | |
| 6,442,443 B1 | 8/2002 | Fujii et al. | |
| D462,339 S | 9/2002 | Allen et al. | |
| D462,340 S | 9/2002 | Allen et al. | |
| D462,945 S | 9/2002 | Skulley | |
| 6,446,080 B1 | 9/2002 | Van Ryzin et al. | |
| 6,449,642 B2 | 9/2002 | Bourke-Dunphy et al. | |
| 6,449,653 B2 * | 9/2002 | Klemets et al. | 709/231 |
| 6,456,783 B1 * | 9/2002 | Ando | G11B 20/12 375/E7.022 |
| 6,463,474 B1 | 10/2002 | Fuh et al. | |
| 6,466,832 B1 | 10/2002 | Zuqert et al. | |
| 6,469,633 B1 | 10/2002 | Wachter | |
| D466,108 S | 11/2002 | Glodava et al. | |
| 6,487,296 B1 | 11/2002 | Allen et al. | |
| 6,493,832 B1 | 12/2002 | Itakura et al. | |
| D468,297 S | 1/2003 | Ikeda | |
| 6,522,886 B1 | 2/2003 | Youngs et al. | |
| 6,526,325 B1 | 2/2003 | Sussman et al. | |
| 6,526,411 B1 | 2/2003 | Ward | |
| 6,535,121 B2 | 3/2003 | Matheny et al. | |
| D474,763 S | 5/2003 | Tozaki et al. | |
| D475,993 S | 6/2003 | Meyer | |
| D476,643 S | 7/2003 | Yamagishi | |
| D477,310 S | 7/2003 | Moransais | |
| 6,587,127 B1 | 7/2003 | Leeke et al. | |
| 6,598,172 B1 | 7/2003 | Vandeusen et al. | |
| D478,051 S | 8/2003 | Sagawa | |
| D478,069 S | 8/2003 | Beck et al. | |
| D478,896 S | 8/2003 | Summers | |
| 6,611,537 B1 | 8/2003 | Edens et al. | |
| 6,611,813 B1 | 8/2003 | Bratton | |
| D479,520 S | 9/2003 | De Saulles | |
| D481,056 S | 10/2003 | Kawasaki et al. | |
| 6,631,410 B1 | 10/2003 | Kowalski et al. | |
| 6,636,269 B1 | 10/2003 | Baldwin | |
| 6,653,899 B2 | 11/2003 | Organvidez et al. | |
| 6,654,720 B1 | 11/2003 | Graham et al. | |
| 6,654,956 B1 | 11/2003 | Trinh et al. | |
| 6,658,091 B1 | 12/2003 | Naidoo et al. | |
| 6,674,803 B1 | 1/2004 | Kesselring | |
| 6,684,060 B1 | 1/2004 | Curtin | |
| D486,145 S | 2/2004 | Kaminski et al. | |
| 6,687,664 B1 | 2/2004 | Sussman et al. | |
| 6,704,421 B1 | 3/2004 | Kitamura | |
| 6,741,961 B2 | 5/2004 | Lim | |
| D491,925 S | 6/2004 | Griesau et al. | |
| 6,757,517 B2 | 6/2004 | Chang | |
| D493,148 S | 7/2004 | Shibata et al. | |
| 6,763,274 B1 * | 7/2004 | Gilbert | G10L 19/005 370/505 |
| D495,333 S | 8/2004 | Borsboom | |
| 6,778,073 B2 | 8/2004 | Lutter et al. | |

(56) References Cited

U.S. PATENT DOCUMENTS

| | | | |
|---|---|---|---|
| 6,778,493 B1 * | 8/2004 | Ishii | H04L 29/06027 370/229 |
| 6,778,869 B2 | 8/2004 | Champion | |
| D496,003 S | 9/2004 | Spira | |
| D496,005 S | 9/2004 | Wang | |
| D496,335 S | 9/2004 | Spira | |
| D497,363 S | 10/2004 | Olson et al. | |
| 6,803,964 B1 * | 10/2004 | Post | H04N 9/8042 348/423.1 |
| 6,809,635 B1 | 10/2004 | Kaaresoja | |
| D499,086 S | 11/2004 | Polito | |
| 6,816,510 B1 | 11/2004 | Banerjee | |
| 6,816,818 B2 | 11/2004 | Wolf et al. | |
| 6,823,225 B1 * | 11/2004 | Sass | 700/94 |
| 6,826,283 B1 | 11/2004 | Wheeler et al. | |
| D499,395 S | 12/2004 | Hsu | |
| D499,718 S | 12/2004 | Chen | |
| D500,015 S | 12/2004 | Gubbe | |
| 6,836,788 B2 | 12/2004 | Kim et al. | |
| 6,839,752 B1 | 1/2005 | Miller et al. | |
| D501,477 S | 2/2005 | Hall | |
| 6,859,460 B1 | 2/2005 | Chen | |
| 6,859,538 B1 | 2/2005 | Voltz | |
| 6,873,862 B2 | 3/2005 | Reshefsky | |
| 6,882,335 B2 | 4/2005 | Saarinen | |
| D504,872 S | 5/2005 | Uehara et al. | |
| D504,885 S | 5/2005 | Zhang et al. | |
| 6,898,642 B2 | 5/2005 | Chafle et al. | |
| 6,901,439 B1 | 5/2005 | Bonasia et al. | |
| D506,463 S | 6/2005 | Daniels | |
| 6,907,458 B2 | 6/2005 | Tomassetti et al. | |
| 6,912,610 B2 | 6/2005 | Spencer | |
| 6,915,347 B2 | 7/2005 | Hanko et al. | |
| 6,917,592 B1 | 7/2005 | Ramankutty et al. | |
| 6,919,771 B2 | 7/2005 | Nakajima | |
| 6,920,373 B2 | 7/2005 | Xi et al. | |
| 6,931,557 B2 | 8/2005 | Togawa | |
| 6,934,766 B1 | 8/2005 | Russell | |
| 6,937,988 B1 | 8/2005 | Hemkumar et al. | |
| 6,970,482 B2 | 11/2005 | Kim | |
| 6,985,694 B1 | 1/2006 | De Bonet et al. | |
| 6,987,767 B2 | 1/2006 | Saito | |
| D515,072 S | 2/2006 | Lee | |
| D515,557 S | 2/2006 | Okuley | |
| 7,006,758 B1 | 2/2006 | Yamamoto et al. | |
| 7,007,106 B1 | 2/2006 | Flood | |
| 7,020,791 B1 | 3/2006 | Aweya et al. | |
| D518,475 S | 4/2006 | Yang et al. | |
| 7,043,477 B2 * | 5/2006 | Mercer | G11B 19/025 |
| 7,043,651 B2 | 5/2006 | Aweya et al. | |
| 7,046,677 B2 | 5/2006 | Monta et al. | |
| 7,047,308 B2 | 5/2006 | Deshpande | |
| 7,054,888 B2 * | 5/2006 | LaChapelle | G11B 27/034 |
| 7,058,889 B2 * | 6/2006 | Trovato | G10H 1/368 348/E5.002 |
| 7,068,596 B1 | 6/2006 | Mou | |
| D524,296 S | 7/2006 | Kita | |
| D527,375 S | 8/2006 | Flora et al. | |
| 7,092,528 B2 | 8/2006 | Patrick et al. | |
| 7,092,694 B2 | 8/2006 | Griep et al. | |
| 7,096,169 B2 | 8/2006 | Crutchfield et al. | |
| 7,113,999 B2 | 9/2006 | Pestoni | |
| 7,115,017 B1 | 10/2006 | Laursen | |
| 7,120,168 B2 | 10/2006 | Zimmermann | |
| 7,130,316 B2 | 10/2006 | Kovacevic | |
| 7,130,368 B1 | 10/2006 | Aweya et al. | |
| 7,130,608 B2 | 10/2006 | Hollstrom | |
| 7,130,616 B2 | 10/2006 | Janik | |
| 7,136,934 B2 | 11/2006 | Carter et al. | |
| 7,139,981 B2 | 11/2006 | Mayer et al. | |
| 7,143,141 B1 | 11/2006 | Morgan et al. | |
| 7,143,939 B2 | 12/2006 | Henzerling | |
| 7,146,260 B2 | 12/2006 | Preston et al. | |
| 7,158,488 B2 | 1/2007 | Fujimori | |
| 7,161,939 B2 | 1/2007 | Israel et al. | |
| 7,162,315 B2 | 1/2007 | Gilbert | |
| 7,185,090 B2 | 2/2007 | Kowalski | |
| 7,187,947 B1 | 3/2007 | White et al. | |
| 7,188,353 B1 * | 3/2007 | Crinon | H04N 7/163 348/E5.005 |
| 7,197,148 B2 | 3/2007 | Nourse et al. | |
| 7,206,367 B1 * | 4/2007 | Moore | H04L 12/66 348/515 |
| 7,206,618 B2 | 4/2007 | Latto et al. | |
| 7,206,967 B1 * | 4/2007 | Marti et al. | 714/25 |
| 7,209,795 B2 * | 4/2007 | Sullivan et al. | 700/94 |
| 7,218,708 B2 | 5/2007 | Berezowski | |
| 7,236,739 B2 | 6/2007 | Chang | |
| 7,236,773 B2 | 6/2007 | Thomas | |
| 7,257,398 B1 | 8/2007 | Ukita et al. | |
| 7,260,616 B1 | 8/2007 | Cook | |
| 7,263,110 B2 | 8/2007 | Fujishiro | |
| 7,277,547 B1 | 10/2007 | Delker et al. | |
| 7,286,652 B1 * | 10/2007 | Azriel | H04L 12/00 370/352 |
| 7,289,631 B2 | 10/2007 | Ishidoshiro | |
| 7,293,060 B2 | 11/2007 | Komsi | |
| 7,295,548 B2 | 11/2007 | Blank et al. | |
| 7,305,694 B2 | 12/2007 | Commons et al. | |
| 7,308,188 B2 | 12/2007 | Namatame | |
| 7,310,334 B1 * | 12/2007 | FitzGerald | H04L 29/06027 370/352 |
| 7,312,785 B2 | 12/2007 | Tsuk et al. | |
| 7,313,593 B1 * | 12/2007 | Pulito et al. | 709/204 |
| 7,319,764 B1 | 1/2008 | Reid et al. | |
| 7,324,857 B2 | 1/2008 | Goddard | |
| 7,330,875 B1 * | 2/2008 | Parasnis | G06Q 10/10 709/203 |
| 7,333,519 B2 * | 2/2008 | Sullivan | H04H 20/18 370/252 |
| 7,356,011 B1 | 4/2008 | Waters et al. | |
| 7,359,006 B1 * | 4/2008 | Xiang | H04N 21/2368 348/515 |
| 7,366,206 B2 | 4/2008 | Lockridge et al. | |
| 7,372,846 B2 | 5/2008 | Zwack | |
| 7,391,791 B2 | 6/2008 | Balassanian et al. | |
| 7,392,102 B2 | 6/2008 | Sullivan et al. | |
| 7,392,481 B2 * | 6/2008 | Gewickey | H04N 21/23614 348/E5.006 |
| 7,400,644 B2 * | 7/2008 | Sakamoto | G11B 20/10 370/465 |
| 7,412,499 B2 | 8/2008 | Chang et al. | |
| 7,428,310 B2 | 9/2008 | Park | |
| 7,430,181 B1 | 9/2008 | Hong | |
| 7,457,948 B1 | 11/2008 | Bilicksa et al. | |
| 7,472,058 B2 | 12/2008 | Tseng et al. | |
| 7,474,677 B2 | 1/2009 | Trott | |
| 7,483,538 B2 | 1/2009 | McCarty et al. | |
| 7,483,540 B2 | 1/2009 | Rabinowitz et al. | |
| 7,483,958 B1 | 1/2009 | Elabbady | |
| 7,492,912 B2 | 2/2009 | Chung et al. | |
| 7,505,889 B2 | 3/2009 | Salmonsen et al. | |
| 7,509,181 B2 | 3/2009 | Champion | |
| 7,519,667 B1 | 4/2009 | Capps | |
| 7,548,744 B2 | 6/2009 | Oesterling et al. | |
| 7,548,851 B1 | 6/2009 | Lau et al. | |
| 7,558,224 B1 | 7/2009 | Surazski et al. | |
| 7,558,635 B1 | 7/2009 | Thiel et al. | |
| 7,571,014 B1 | 8/2009 | Lambourne | |
| 7,574,274 B2 | 8/2009 | Holmes | |
| 7,599,685 B2 | 10/2009 | Goldberg | |
| 7,606,174 B2 | 10/2009 | Ochi et al. | |
| 7,627,825 B2 | 12/2009 | Kakuda | |
| 7,630,501 B2 | 12/2009 | Blank et al. | |
| 7,631,119 B2 | 12/2009 | Moore et al. | |
| 7,643,894 B2 | 1/2010 | Braithwaite et al. | |
| 7,653,344 B1 | 1/2010 | Feldman et al. | |
| 7,657,224 B2 | 2/2010 | Goldberg | |
| 7,657,644 B1 | 2/2010 | Zheng | |
| 7,657,910 B1 | 2/2010 | McAulay et al. | |
| 7,665,115 B2 | 2/2010 | Gallo et al. | |
| 7,668,990 B2 | 2/2010 | Krzyzanowski | |
| 7,669,113 B1 | 2/2010 | Moore et al. | |

(56) References Cited

U.S. PATENT DOCUMENTS

| | | | |
|---|---|---|---|
| 7,669,219 B2 | 2/2010 | Scott | |
| 7,672,470 B2 | 3/2010 | Lee | |
| 7,675,943 B2 | 3/2010 | Mosig et al. | |
| 7,676,044 B2 | 3/2010 | Sasaki et al. | |
| 7,676,142 B1* | 3/2010 | Hung | G11B 27/005 348/446 |
| 7,688,306 B2 | 3/2010 | Wehrenberg et al. | |
| 7,689,304 B2 | 3/2010 | Sasaki | |
| 7,689,305 B2 | 3/2010 | Kreifeldt et al. | |
| 7,702,279 B2 | 4/2010 | Ko | |
| 7,702,403 B1 | 4/2010 | Gladwin et al. | |
| 7,710,941 B2 | 5/2010 | Rietschel et al. | |
| 7,711,774 B1 | 5/2010 | Rothschild | |
| 7,720,096 B2 | 5/2010 | Klemets | |
| 7,721,032 B2 | 5/2010 | Bushell et al. | |
| 7,742,740 B2 | 6/2010 | Goldberg et al. | |
| 7,743,009 B2 | 6/2010 | Hangartner et al. | |
| 7,746,906 B2 | 6/2010 | Jinzaki et al. | |
| 7,756,743 B1 | 7/2010 | Lapcevic | |
| 7,761,176 B2 | 7/2010 | Ben-Yaacov et al. | |
| 7,765,315 B2 | 7/2010 | Batson et al. | |
| RE41,608 E* | 8/2010 | Blair et al. | 379/67.1 |
| 7,793,206 B2* | 9/2010 | Lim | G06F 17/30781 715/201 |
| 7,827,259 B2 | 11/2010 | Heller et al. | |
| 7,831,054 B2 | 11/2010 | Ball et al. | |
| 7,835,689 B2 | 11/2010 | Goldberg | |
| 7,853,341 B2 | 12/2010 | McCarty et al. | |
| 7,865,137 B2 | 1/2011 | Goldberg | |
| 7,882,234 B2 | 2/2011 | Watanabe et al. | |
| 7,885,622 B2 | 2/2011 | Krampf | |
| 7,907,819 B2* | 3/2011 | Ando | H04N 21/4325 386/240 |
| 7,916,877 B2 | 3/2011 | Goldberg | |
| 7,917,082 B2 | 3/2011 | Goldberg | |
| 7,933,418 B2 | 4/2011 | Morishima | |
| 7,934,239 B1 | 4/2011 | Dagman | |
| 7,945,143 B2 | 5/2011 | Yahata et al. | |
| 7,945,636 B2 | 5/2011 | Nelson et al. | |
| 7,945,708 B2 | 5/2011 | Ohkita | |
| 7,958,441 B2 | 6/2011 | Heller et al. | |
| 7,966,388 B1 | 6/2011 | Pugaczewski et al. | |
| 7,987,294 B2 | 7/2011 | Bryce et al. | |
| 7,995,732 B2 | 8/2011 | Koch et al. | |
| 7,996,566 B1 | 8/2011 | Sylvain et al. | |
| 7,996,588 B2 | 8/2011 | Subbiah et al. | |
| 8,014,423 B2 | 9/2011 | Thaler et al. | |
| 8,015,306 B2 | 9/2011 | Bowman | |
| 8,020,023 B2 | 9/2011 | Millington et al. | |
| 8,023,663 B2 | 9/2011 | Goldberg | |
| 8,028,038 B2 | 9/2011 | Weel | |
| 8,028,323 B2 | 9/2011 | Weel | |
| 8,041,062 B2 | 10/2011 | Cohen et al. | |
| 8,045,721 B2 | 10/2011 | Burgan et al. | |
| 8,045,952 B2 | 10/2011 | Qureshey et al. | |
| 8,050,203 B2 | 11/2011 | Jacobsen et al. | |
| 8,050,652 B2 | 11/2011 | Qureshey et al. | |
| 8,055,364 B2 | 11/2011 | Champion | |
| 8,074,253 B1 | 12/2011 | Nathan | |
| 8,086,752 B2 | 12/2011 | Millington | |
| 8,090,317 B2 | 1/2012 | Burge et al. | |
| 8,103,009 B2 | 1/2012 | McCarty et al. | |
| 8,111,132 B2 | 2/2012 | Allen et al. | |
| 8,112,032 B2 | 2/2012 | Ko | |
| 8,116,476 B2 | 2/2012 | Inohara | |
| 8,126,172 B2 | 2/2012 | Horbach et al. | |
| 8,131,390 B2 | 3/2012 | Braithwaite et al. | |
| 8,144,883 B2 | 3/2012 | Pdersen et al. | |
| 8,148,622 B2 | 4/2012 | Rothkopf et al. | |
| 8,150,079 B2 | 4/2012 | Maeda et al. | |
| 8,169,938 B2 | 5/2012 | Duchscher et al. | |
| 8,170,222 B2 | 5/2012 | Dunko | |
| 8,170,260 B2 | 5/2012 | Reining et al. | |
| 8,175,297 B1 | 5/2012 | Ho et al. | |
| 8,185,674 B2 | 5/2012 | Moore et al. | |
| 8,194,874 B2 | 6/2012 | Starobin et al. | |
| 8,204,890 B1 | 6/2012 | Gogan | |
| 8,208,653 B2 | 6/2012 | Eo et al. | |
| 8,214,447 B2 | 7/2012 | Deslippe et al. | |
| 8,214,740 B2 | 7/2012 | Johnson | |
| 8,214,873 B2 | 7/2012 | Weel | |
| 8,218,790 B2 | 7/2012 | Bull et al. | |
| 8,230,099 B2 | 7/2012 | Weel | |
| 8,233,029 B2 | 7/2012 | Yoshida et al. | |
| 8,233,648 B2 | 7/2012 | Sorek et al. | |
| 8,234,395 B2 | 7/2012 | Millington | |
| 8,239,748 B1 | 8/2012 | Moore et al. | |
| 8,279,709 B2 | 10/2012 | Choisel et al. | |
| 8,281,001 B2 | 10/2012 | Busam et al. | |
| 8,285,404 B1 | 10/2012 | Kekki | |
| 8,290,603 B1 | 10/2012 | Lambourne | |
| 8,300,845 B2 | 10/2012 | Zurek et al. | |
| 8,311,226 B2 | 11/2012 | Lorgeoux et al. | |
| 8,315,555 B2 | 11/2012 | Ko | |
| 8,316,147 B2 | 11/2012 | Batson et al. | |
| 8,325,931 B2 | 12/2012 | Howard et al. | |
| 8,340,330 B2 | 12/2012 | Yoon et al. | |
| 8,345,709 B2 | 1/2013 | Nitzpon et al. | |
| 8,364,295 B2 | 1/2013 | Beckmann et al. | |
| 8,370,678 B2 | 2/2013 | Millington | |
| 8,374,595 B2 | 2/2013 | Chien et al. | |
| 8,407,623 B2 | 3/2013 | Kerr et al. | |
| 8,411,883 B2 | 4/2013 | Matsumoto | |
| 8,423,659 B2 | 4/2013 | Millington | |
| 8,423,893 B2 | 4/2013 | Ramsay et al. | |
| 8,432,851 B2 | 4/2013 | Xu et al. | |
| 8,433,076 B2 | 4/2013 | Zurek et al. | |
| 8,442,239 B2 | 5/2013 | Bruelle-Drews et al. | |
| 8,457,334 B2 | 6/2013 | Yoon et al. | |
| 8,463,184 B2 | 6/2013 | Dua | |
| 8,463,875 B2 | 6/2013 | Katz et al. | |
| 8,473,844 B2 | 6/2013 | Kreifeldt et al. | |
| 8,477,958 B2 | 7/2013 | Moeller et al. | |
| 8,483,853 B1 | 7/2013 | Lambourne | |
| 8,509,211 B2 | 8/2013 | Trotter et al. | |
| 8,520,870 B2 | 8/2013 | Sato et al. | |
| 8,565,455 B2 | 10/2013 | Worrell et al. | |
| 8,577,048 B2 | 11/2013 | Chaikin et al. | |
| 8,588,949 B2 | 11/2013 | Lambourne et al. | |
| 8,600,084 B1 | 12/2013 | Garrett | |
| 8,611,559 B2 | 12/2013 | Sanders | |
| 8,615,091 B2 | 12/2013 | Terwal | |
| 8,639,830 B2 | 1/2014 | Bowman | |
| 8,654,995 B2 | 2/2014 | Silber et al. | |
| 8,672,744 B1 | 3/2014 | Gronkowski et al. | |
| 8,683,009 B2 | 3/2014 | Ng et al. | |
| 8,731,206 B1 | 5/2014 | Park | |
| 8,750,282 B2 | 6/2014 | Gelter et al. | |
| 8,751,026 B2 | 6/2014 | Sato et al. | |
| 8,762,565 B2 | 6/2014 | Togashi et al. | |
| 8,818,538 B2 | 8/2014 | Sakata | |
| 8,819,554 B2 | 8/2014 | Basso et al. | |
| 8,843,586 B2 | 9/2014 | Pantos et al. | |
| 8,861,739 B2 | 10/2014 | Ojanpera | |
| 8,885,851 B2 | 11/2014 | Westenbroek | |
| 8,904,066 B2 | 12/2014 | Moore et al. | |
| 8,917,877 B2 | 12/2014 | Haaff et al. | |
| 8,930,006 B2 | 1/2015 | Haatainen | |
| 8,934,647 B2 | 1/2015 | Joyce et al. | |
| 8,934,655 B2 | 1/2015 | Breen et al. | |
| 8,942,252 B2 | 1/2015 | Balassanian et al. | |
| 8,942,395 B2 | 1/2015 | Lissaman et al. | |
| 8,954,177 B2 | 2/2015 | Sanders | |
| 8,965,544 B2 | 2/2015 | Ramsay | |
| 8,966,394 B2 | 2/2015 | Gates et al. | |
| 9,137,602 B2 | 9/2015 | Mayman et al. | |
| 9,160,965 B2 | 10/2015 | Redmann et al. | |
| 9,456,243 B1* | 9/2016 | Hughes | H04N 21/44016 |
| 9,507,780 B2 | 11/2016 | Rothkopf et al. | |
| 2001/0001160 A1* | 5/2001 | Shoff | H04N 5/44543 725/51 |
| 2001/0009604 A1 | 7/2001 | Ando et al. | |
| 2001/0022823 A1 | 9/2001 | Renaud | |
| 2001/0027498 A1 | 10/2001 | Van De Meulenhof et al. | |

(56) References Cited

U.S. PATENT DOCUMENTS

| | | |
|---|---|---|
| 2001/0032188 A1 | 10/2001 | Miyabe |
| 2001/0042107 A1 | 11/2001 | Palm |
| 2001/0043456 A1 | 11/2001 | Atkinson |
| 2001/0046235 A1* | 11/2001 | Trevitt et al. .............. 370/412 |
| 2001/0047377 A1 | 11/2001 | Sincaglia et al. |
| 2001/0050991 A1 | 12/2001 | Eves |
| 2002/0002039 A1 | 1/2002 | Qureshey et al. |
| 2002/0002562 A1 | 1/2002 | Moran |
| 2002/0003548 A1 | 1/2002 | Krusche |
| 2002/0015003 A1 | 2/2002 | Kato et al. |
| 2002/0022453 A1 | 2/2002 | Balog |
| 2002/0026442 A1 | 2/2002 | Lipscomb |
| 2002/0034374 A1 | 3/2002 | Barton |
| 2002/0035621 A1 | 3/2002 | Zintel et al. |
| 2002/0042844 A1 | 4/2002 | Chiazzese |
| 2002/0049843 A1 | 4/2002 | Barone, Jr. et al. |
| 2002/0062406 A1 | 5/2002 | Chang et al. |
| 2002/0065926 A1 | 5/2002 | Hackney et al. |
| 2002/0067909 A1 | 6/2002 | Iivonen |
| 2002/0072816 A1 | 6/2002 | Shdema et al. |
| 2002/0072817 A1 | 6/2002 | Champion |
| 2002/0073228 A1 | 6/2002 | Cognet |
| 2002/0078293 A1 | 6/2002 | Kou et al. |
| 2002/0080783 A1 | 6/2002 | Fujimori |
| 2002/0090914 A1 | 7/2002 | Kang et al. |
| 2002/0093478 A1 | 7/2002 | Yeh |
| 2002/0095460 A1 | 7/2002 | Benson |
| 2002/0098878 A1 | 7/2002 | Mooney et al. |
| 2002/0101357 A1 | 8/2002 | Gharapetian |
| 2002/0103635 A1* | 8/2002 | Mesarovic ........... H04B 14/046 704/200.1 |
| 2002/0109710 A1 | 8/2002 | Holtz |
| 2002/0112244 A1 | 8/2002 | Liou et al. |
| 2002/0114354 A1 | 8/2002 | Sinha et al. |
| 2002/0114359 A1 | 8/2002 | Ibaraki et al. |
| 2002/0124097 A1 | 9/2002 | Isely et al. |
| 2002/0124182 A1* | 9/2002 | Bacso ................... G06Q 30/02 726/26 |
| 2002/0129156 A1 | 9/2002 | Yoshikawa |
| 2002/0131398 A1* | 9/2002 | Taylor ................. H04J 3/0632 370/350 |
| 2002/0131761 A1 | 9/2002 | Kawasaki et al. |
| 2002/0136335 A1* | 9/2002 | Liou ................... H04J 3/0667 375/354 |
| 2002/0137505 A1 | 9/2002 | Eiche et al. |
| 2002/0143998 A1 | 10/2002 | Rajagopal |
| 2002/0150053 A1 | 10/2002 | Gray et al. |
| 2002/0159596 A1 | 10/2002 | Durand et al. |
| 2002/0163361 A1 | 11/2002 | Parkin |
| 2002/0165721 A1 | 11/2002 | Chang et al. |
| 2002/0165921 A1 | 11/2002 | Sapieyevski |
| 2002/0168938 A1 | 11/2002 | Chang |
| 2002/0173273 A1 | 11/2002 | Spurgat et al. |
| 2002/0177411 A1 | 11/2002 | Yajima et al. |
| 2002/0181355 A1 | 12/2002 | Shikunami et al. |
| 2002/0184310 A1 | 12/2002 | Traversat et al. |
| 2002/0188762 A1 | 12/2002 | Tomassetti |
| 2002/0194260 A1 | 12/2002 | Headley et al. |
| 2002/0194309 A1 | 12/2002 | Carter et al. |
| 2003/0002609 A1 | 1/2003 | Faller et al. |
| 2003/0008616 A1 | 1/2003 | Anderson |
| 2003/0014486 A1 | 1/2003 | May |
| 2003/0018797 A1 | 1/2003 | Dunning et al. |
| 2003/0020763 A1 | 1/2003 | Mayer |
| 2003/0023741 A1 | 1/2003 | Tomassetti |
| 2003/0035072 A1 | 2/2003 | Hagg |
| 2003/0035444 A1 | 2/2003 | Zwack |
| 2003/0041173 A1 | 2/2003 | Hoyle |
| 2003/0041174 A1 | 2/2003 | Wen et al. |
| 2003/0043856 A1 | 3/2003 | Lakaniemi et al. |
| 2003/0043924 A1 | 3/2003 | Haddad et al. |
| 2003/0050058 A1 | 3/2003 | Walsh et al. |
| 2003/0055892 A1 | 3/2003 | Huitema et al. |
| 2003/0061428 A1 | 3/2003 | Garney et al. |
| 2003/0063528 A1 | 4/2003 | Ogikubo |
| 2003/0063755 A1 | 4/2003 | Nourse et al. |
| 2003/0066094 A1 | 4/2003 | van der Schaar et al. |
| 2003/0067437 A1 | 4/2003 | McClintock et al. |
| 2003/0073432 A1 | 4/2003 | Meade |
| 2003/0097478 A1* | 5/2003 | King ................... G06F 1/1601 709/248 |
| 2003/0099212 A1 | 5/2003 | Anjum et al. |
| 2003/0099221 A1 | 5/2003 | Rhee |
| 2003/0101253 A1 | 5/2003 | Saito et al. |
| 2003/0103088 A1 | 6/2003 | Dresti et al. |
| 2003/0110329 A1 | 6/2003 | Higaki et al. |
| 2003/0123853 A1 | 7/2003 | Iwahara et al. |
| 2003/0126211 A1 | 7/2003 | Anttila et al. |
| 2003/0135822 A1* | 7/2003 | Evans ................ H04N 21/2368 715/203 |
| 2003/0157951 A1 | 8/2003 | Hasty, Jr. |
| 2003/0167335 A1 | 9/2003 | Alexander |
| 2003/0172123 A1* | 9/2003 | Polan ................ H04L 29/06027 709/213 |
| 2003/0179780 A1 | 9/2003 | Walker et al. |
| 2003/0182254 A1 | 9/2003 | Plastina et al. |
| 2003/0185400 A1 | 10/2003 | Yoshizawa et al. |
| 2003/0195964 A1 | 10/2003 | Mane |
| 2003/0198254 A1 | 10/2003 | Sullivan et al. |
| 2003/0198255 A1 | 10/2003 | Sullivan et al. |
| 2003/0198257 A1 | 10/2003 | Sullivan et al. |
| 2003/0200001 A1* | 10/2003 | Goddard ............ H04L 12/2803 700/94 |
| 2003/0204273 A1 | 10/2003 | Dinker et al. |
| 2003/0204509 A1 | 10/2003 | Dinker et al. |
| 2003/0210796 A1 | 11/2003 | McCarty |
| 2003/0212802 A1 | 11/2003 | Rector et al. |
| 2003/0219007 A1* | 11/2003 | Barrack et al. ............. 370/352 |
| 2003/0227478 A1 | 12/2003 | Chatfield |
| 2003/0229900 A1 | 12/2003 | Reisman |
| 2003/0231208 A1 | 12/2003 | Hanon et al. |
| 2003/0231871 A1 | 12/2003 | Ushimaru |
| 2003/0235304 A1 | 12/2003 | Evans et al. |
| 2004/0001106 A1* | 1/2004 | Deutscher ......... G06F 17/30017 715/838 |
| 2004/0001484 A1 | 1/2004 | Ozguner |
| 2004/0001591 A1 | 1/2004 | Mani et al. |
| 2004/0002938 A1 | 1/2004 | Deguchi |
| 2004/0008852 A1 | 1/2004 | Also |
| 2004/0010727 A1 | 1/2004 | Fujiname |
| 2004/0012620 A1 | 1/2004 | Buhler et al. |
| 2004/0014426 A1 | 1/2004 | Moore |
| 2004/0015252 A1 | 1/2004 | Also |
| 2004/0019497 A1 | 1/2004 | Volk et al. |
| 2004/0019807 A1 | 1/2004 | Freund et al. |
| 2004/0019911 A1* | 1/2004 | Gates ................... H04N 5/9267 725/90 |
| 2004/0023697 A1 | 2/2004 | Komura |
| 2004/0024478 A1 | 2/2004 | Hans |
| 2004/0024925 A1 | 2/2004 | Cypher |
| 2004/0027166 A1 | 2/2004 | Mangum |
| 2004/0032348 A1 | 2/2004 | Lai et al. |
| 2004/0032421 A1 | 2/2004 | Williamson et al. |
| 2004/0037433 A1 | 2/2004 | Chen |
| 2004/0041836 A1 | 3/2004 | Zaner et al. |
| 2004/0042629 A1 | 3/2004 | Mellone et al. |
| 2004/0044742 A1 | 3/2004 | Evron et al. |
| 2004/0048569 A1 | 3/2004 | Kawamura |
| 2004/0059842 A1 | 3/2004 | Hanson et al. |
| 2004/0059965 A1 | 3/2004 | Marshall et al. |
| 2004/0066736 A1 | 4/2004 | Kroeger |
| 2004/0075767 A1 | 4/2004 | Neuman et al. |
| 2004/0078383 A1 | 4/2004 | Mercer et al. |
| 2004/0080671 A1* | 4/2004 | Siemens et al. ............. 348/473 |
| 2004/0093096 A1 | 5/2004 | Huang et al. |
| 2004/0098754 A1 | 5/2004 | Vella et al. |
| 2004/0111473 A1* | 6/2004 | Lysenko ............ H04L 29/06027 709/206 |
| 2004/0117462 A1 | 6/2004 | Bodin et al. |
| 2004/0117491 A1 | 6/2004 | Karaoguz et al. |
| 2004/0117840 A1* | 6/2004 | Boudreau .............. G09B 5/065 725/98 |

(56) References Cited

U.S. PATENT DOCUMENTS

| | | | |
|---|---|---|---|
| 2004/0117858 A1* | 6/2004 | Boudreau | H04N 21/4122 725/144 |
| 2004/0128701 A1* | 7/2004 | Kaneko | H04N 7/17318 725/136 |
| 2004/0131192 A1 | 7/2004 | Metcalf | |
| 2004/0133689 A1 | 7/2004 | Vasisht | |
| 2004/0143368 A1 | 7/2004 | May et al. | |
| 2004/0143852 A1 | 7/2004 | Meyers | |
| 2004/0148237 A1 | 7/2004 | Bittmann et al. | |
| 2004/0168081 A1 | 8/2004 | Ladas et al. | |
| 2004/0170383 A1 | 9/2004 | Mazur | |
| 2004/0171346 A1 | 9/2004 | Lin | |
| 2004/0177167 A1 | 9/2004 | Iwamura et al. | |
| 2004/0179554 A1* | 9/2004 | Tsao | H04N 7/173 370/486 |
| 2004/0183827 A1 | 9/2004 | Putterman et al. | |
| 2004/0185773 A1 | 9/2004 | Gerber et al. | |
| 2004/0203378 A1 | 10/2004 | Powers | |
| 2004/0203590 A1 | 10/2004 | Shteyn | |
| 2004/0208158 A1 | 10/2004 | Fellman et al. | |
| 2004/0213230 A1 | 10/2004 | Douskalis et al. | |
| 2004/0223622 A1 | 11/2004 | Lindemann et al. | |
| 2004/0224638 A1 | 11/2004 | Fadell et al. | |
| 2004/0228367 A1 | 11/2004 | Mosig | |
| 2004/0248601 A1 | 12/2004 | Chang | |
| 2004/0249490 A1 | 12/2004 | Sakai | |
| 2004/0249965 A1 | 12/2004 | Huggins et al. | |
| 2004/0249982 A1 | 12/2004 | Arnold | |
| 2004/0252400 A1 | 12/2004 | Blank | |
| 2004/0253969 A1 | 12/2004 | Nguyen et al. | |
| 2005/0010691 A1 | 1/2005 | Oyadomari | |
| 2005/0011388 A1 | 1/2005 | Kouznetsov | |
| 2005/0013394 A1 | 1/2005 | Rausch et al. | |
| 2005/0015551 A1 | 1/2005 | Eames et al. | |
| 2005/0021590 A1 | 1/2005 | Debique et al. | |
| 2005/0027821 A1 | 2/2005 | Alexander et al. | |
| 2005/0047605 A1 | 3/2005 | Lee | |
| 2005/0058149 A1 | 3/2005 | Howe | |
| 2005/0060435 A1 | 3/2005 | Xue et al. | |
| 2005/0062637 A1 | 3/2005 | El Zabadani et al. | |
| 2005/0081213 A1 | 4/2005 | Suzuoki | |
| 2005/0105052 A1 | 5/2005 | McCormick et al. | |
| 2005/0114538 A1 | 5/2005 | Rose | |
| 2005/0120128 A1 | 6/2005 | Willes et al. | |
| 2005/0125222 A1 | 6/2005 | Brown et al. | |
| 2005/0125357 A1 | 6/2005 | Saadat et al. | |
| 2005/0131558 A1 | 6/2005 | Braithwaite et al. | |
| 2005/0154766 A1 | 7/2005 | Huang et al. | |
| 2005/0159833 A1 | 7/2005 | Giaimo et al. | |
| 2005/0160270 A1 | 7/2005 | Goldberg et al. | |
| 2005/0166135 A1 | 7/2005 | Burke et al. | |
| 2005/0168630 A1 | 8/2005 | Yamada et al. | |
| 2005/0177643 A1 | 8/2005 | Xu | |
| 2005/0181348 A1 | 8/2005 | Carey | |
| 2005/0195205 A1 | 9/2005 | Abrams, Jr. | |
| 2005/0195823 A1 | 9/2005 | Chen et al. | |
| 2005/0197725 A1 | 9/2005 | Alexander et al. | |
| 2005/0198574 A1* | 9/2005 | Lamkin | G06F 21/10 715/719 |
| 2005/0201549 A1 | 9/2005 | Dedieu et al. | |
| 2005/0216556 A1 | 9/2005 | Manion et al. | |
| 2005/0262217 A1 | 11/2005 | Nonaka et al. | |
| 2005/0281255 A1 | 12/2005 | Davies et al. | |
| 2005/0283820 A1 | 12/2005 | Richards et al. | |
| 2005/0288805 A1 | 12/2005 | Moore et al. | |
| 2005/0289224 A1 | 12/2005 | Deslippe | |
| 2006/0041639 A1* | 2/2006 | Lamkin | G06F 3/04847 709/219 |
| 2006/0072489 A1 | 4/2006 | Toyoshima | |
| 2006/0095516 A1 | 5/2006 | Wijeratne | |
| 2006/0098936 A1 | 5/2006 | Ikeda et al. | |
| 2006/0119497 A1 | 6/2006 | Miller et al. | |
| 2006/0143236 A1 | 6/2006 | Wu | |
| 2006/0155721 A1 | 7/2006 | Grunwald et al. | |
| 2006/0161742 A1 | 7/2006 | Sugimoto et al. | |
| 2006/0173844 A1 | 8/2006 | Zhang et al. | |
| 2006/0193454 A1* | 8/2006 | Abou-chakra et al. | 379/90.01 |
| 2006/0222186 A1 | 10/2006 | Paige et al. | |
| 2006/0227985 A1 | 10/2006 | Kawanami | |
| 2006/0259649 A1 | 11/2006 | Hsieh et al. | |
| 2006/0270395 A1 | 11/2006 | Dhawan et al. | |
| 2007/0003067 A1 | 1/2007 | Gierl et al. | |
| 2007/0022207 A1 | 1/2007 | Millington et al. | |
| 2007/0038999 A1 | 2/2007 | Millington | |
| 2007/0043847 A1 | 2/2007 | Carter et al. | |
| 2007/0047712 A1 | 3/2007 | Gross et al. | |
| 2007/0048713 A1 | 3/2007 | Plastina | |
| 2007/0054680 A1 | 3/2007 | Mo et al. | |
| 2007/0087686 A1 | 4/2007 | Holm et al. | |
| 2007/0142022 A1 | 6/2007 | Madonna | |
| 2007/0142944 A1 | 6/2007 | Goldberg | |
| 2007/0143493 A1 | 6/2007 | Mullig et al. | |
| 2007/0169115 A1 | 7/2007 | Ko | |
| 2007/0180137 A1 | 8/2007 | Rajapakse | |
| 2007/0192156 A1 | 8/2007 | Gauger | |
| 2007/0249295 A1 | 10/2007 | Ukita et al. | |
| 2007/0265031 A1 | 11/2007 | Koizumi et al. | |
| 2007/0271388 A1 | 11/2007 | Bowra et al. | |
| 2007/0299778 A1 | 12/2007 | Haveson | |
| 2008/0002836 A1 | 1/2008 | Moeller et al. | |
| 2008/0007649 A1* | 1/2008 | Bennett | H04N 5/44 348/443 |
| 2008/0007650 A1* | 1/2008 | Bennett | H04N 5/44 348/443 |
| 2008/0007651 A1* | 1/2008 | Bennett | H04N 7/162 348/443 |
| 2008/0018785 A1* | 1/2008 | Bennett | H04N 5/44 348/439.1 |
| 2008/0022320 A1 | 1/2008 | Ver Steeg | |
| 2008/0025535 A1 | 1/2008 | Rajapakse | |
| 2008/0072816 A1 | 3/2008 | Riess et al. | |
| 2008/0075295 A1 | 3/2008 | Mayman et al. | |
| 2008/0077619 A1 | 3/2008 | Gilley et al. | |
| 2008/0077620 A1 | 3/2008 | Gilley et al. | |
| 2008/0086318 A1 | 4/2008 | Gilley et al. | |
| 2008/0091771 A1 | 4/2008 | Allen | |
| 2008/0120429 A1 | 5/2008 | Millington | |
| 2008/0126943 A1 | 5/2008 | Parasnis et al. | |
| 2008/0144861 A1 | 6/2008 | Melanson | |
| 2008/0144864 A1 | 6/2008 | Huon | |
| 2008/0146289 A1 | 6/2008 | Korneluk et al. | |
| 2008/0189272 A1 | 8/2008 | Powers et al. | |
| 2008/0205070 A1 | 8/2008 | Osada | |
| 2008/0212786 A1 | 9/2008 | Park | |
| 2008/0215169 A1 | 9/2008 | DeBettencourt et al. | |
| 2008/0263010 A1 | 10/2008 | Roychoudhuri et al. | |
| 2008/0303947 A1 | 12/2008 | Ohnishi et al. | |
| 2009/0011798 A1 | 1/2009 | Yamada | |
| 2009/0017868 A1 | 1/2009 | Ueda et al. | |
| 2009/0031336 A1 | 1/2009 | Chavez | |
| 2009/0070434 A1 | 3/2009 | Himmelstein | |
| 2009/0089327 A1 | 4/2009 | Kalaboukis et al. | |
| 2009/0100189 A1 | 4/2009 | Bahren et al. | |
| 2009/0124289 A1 | 5/2009 | Nishida | |
| 2009/0157905 A1 | 6/2009 | Davis | |
| 2009/0164655 A1* | 6/2009 | Pettersson | H04L 65/4015 709/231 |
| 2009/0193345 A1 | 7/2009 | Wensley et al. | |
| 2009/0222115 A1 | 9/2009 | Malcolm | |
| 2009/0228919 A1 | 9/2009 | Zott | |
| 2009/0251604 A1 | 10/2009 | Iyer | |
| 2010/0031366 A1 | 2/2010 | Knight et al. | |
| 2010/0049835 A1 | 2/2010 | Ko | |
| 2010/0087089 A1 | 4/2010 | Struthers et al. | |
| 2010/0228740 A1 | 9/2010 | Cannistraro | |
| 2010/0284389 A1 | 11/2010 | Ramsay et al. | |
| 2010/0299639 A1 | 11/2010 | Ramsay et al. | |
| 2011/0001632 A1 | 1/2011 | Hohorst | |
| 2011/0002487 A1 | 1/2011 | Panther et al. | |
| 2011/0066943 A1 | 3/2011 | Brillon | |
| 2011/0228944 A1 | 9/2011 | Croghan et al. | |
| 2011/0316768 A1 | 12/2011 | McRae | |
| 2012/0029671 A1 | 2/2012 | Millington | |

(56) References Cited

U.S. PATENT DOCUMENTS

| | | |
|---|---|---|
| 2012/0030366 A1 | 2/2012 | Collart |
| 2012/0051567 A1 | 3/2012 | Castor-Perry |
| 2012/0060046 A1 | 3/2012 | Millington |
| 2012/0129446 A1 | 5/2012 | Ko |
| 2012/0148075 A1 | 6/2012 | Goh et al. |
| 2012/0185771 A1 | 7/2012 | Rothkopf et al. |
| 2012/0192071 A1 | 7/2012 | Millington |
| 2012/0207290 A1 | 8/2012 | Moyers et al. |
| 2012/0237054 A1 | 9/2012 | Eo et al. |
| 2012/0281058 A1 | 11/2012 | Laney et al. |
| 2012/0290621 A1 | 11/2012 | Heitz, III et al. |
| 2013/0018960 A1 | 1/2013 | Knysz et al. |
| 2013/0022221 A1* | 1/2013 | Kallai et al. ............... 381/300 |
| 2013/0031475 A1 | 1/2013 | Maor et al. |
| 2013/0038726 A1 | 2/2013 | Kim |
| 2013/0041954 A1 | 2/2013 | Kim et al. |
| 2013/0047084 A1 | 2/2013 | Sanders et al. |
| 2013/0052940 A1 | 2/2013 | Brillhart et al. |
| 2013/0070093 A1 | 3/2013 | Rivera et al. |
| 2013/0080599 A1 | 3/2013 | Ko |
| 2013/0094670 A1 | 4/2013 | Millington |
| 2013/0124664 A1 | 5/2013 | Fonseca, Jr. et al. |
| 2013/0129122 A1 | 5/2013 | Johnson et al. |
| 2013/0132837 A1 | 5/2013 | Mead et al. |
| 2013/0159126 A1 | 6/2013 | Elkady |
| 2013/0167029 A1 | 6/2013 | Friesen et al. |
| 2013/0174100 A1 | 7/2013 | Seymour et al. |
| 2013/0174223 A1 | 7/2013 | Dykeman et al. |
| 2013/0179163 A1 | 7/2013 | Herbig et al. |
| 2013/0191454 A1 | 7/2013 | Oliver |
| 2013/0197682 A1 | 8/2013 | Millington |
| 2013/0208911 A1 | 8/2013 | Millington |
| 2013/0208921 A1 | 8/2013 | Millington |
| 2013/0226323 A1 | 8/2013 | Millington |
| 2013/0230175 A1 | 9/2013 | Bech et al. |
| 2013/0232416 A1 | 9/2013 | Millington |
| 2013/0253934 A1 | 9/2013 | Parekh et al. |
| 2013/0279706 A1 | 10/2013 | Marti |
| 2013/0287186 A1 | 10/2013 | Quady |
| 2013/0290504 A1 | 10/2013 | Quady |
| 2014/0006483 A1 | 1/2014 | Garmark et al. |
| 2014/0037097 A1 | 2/2014 | Labosco |
| 2014/0064501 A1 | 3/2014 | Olsen et al. |
| 2014/0075308 A1 | 3/2014 | Sanders et al. |
| 2014/0075311 A1 | 3/2014 | Boettcher et al. |
| 2014/0079242 A1 | 3/2014 | Nguyen et al. |
| 2014/0108929 A1 | 4/2014 | Garmark et al. |
| 2014/0123005 A1 | 5/2014 | Forstall et al. |
| 2014/0140530 A1 | 5/2014 | Gomes-Casseres et al. |
| 2014/0161265 A1 | 6/2014 | Chaikin et al. |
| 2014/0181569 A1 | 6/2014 | Millington et al. |
| 2014/0242913 A1 | 8/2014 | Pang |
| 2014/0256260 A1 | 9/2014 | Ueda et al. |
| 2014/0267148 A1 | 9/2014 | Luna et al. |
| 2014/0270202 A1 | 9/2014 | Ivanov et al. |
| 2014/0273859 A1 | 9/2014 | Luna et al. |
| 2014/0279889 A1 | 9/2014 | Luna |
| 2014/0285313 A1 | 9/2014 | Luna et al. |
| 2014/0286496 A1 | 9/2014 | Luna et al. |
| 2014/0298174 A1 | 10/2014 | Ikonomov |
| 2014/0323036 A1 | 10/2014 | Daley et al. |
| 2014/0344689 A1 | 11/2014 | Scott et al. |
| 2014/0378056 A1 | 12/2014 | Liu |
| 2015/0019670 A1 | 1/2015 | Redmann |
| 2015/0026613 A1 | 1/2015 | Kwon et al. |
| 2015/0032844 A1 | 1/2015 | Tarr et al. |
| 2015/0043736 A1 | 2/2015 | Olsen et al. |
| 2015/0049248 A1 | 2/2015 | Wang et al. |
| 2015/0074527 A1 | 3/2015 | Sevigny et al. |
| 2015/0074528 A1 | 3/2015 | Sakalowsky et al. |
| 2015/0098576 A1 | 4/2015 | Sundaresan et al. |
| 2015/0139210 A1 | 5/2015 | Marin et al. |
| 2015/0256954 A1 | 9/2015 | Carlsson et al. |
| 2015/0304288 A1 | 10/2015 | Balasaygun et al. |
| 2015/0365987 A1 | 12/2015 | Weel |

FOREIGN PATENT DOCUMENTS

| | | | | |
|---|---|---|---|---|
| CN | 101292500 A | 10/2008 | | |
| EP | 0251584 | 1/1988 | | |
| EP | 0672985 | 9/1995 | | |
| EP | 0772374 A2 | 5/1997 | | |
| EP | 0895427 A2 * | 2/1999 | ........ | H04N 21/2368 |
| EP | 1111527 | 6/2001 | | |
| EP | 1122931 A2 | 8/2001 | | |
| EP | 1312188 A1 | 5/2003 | | |
| EP | 1389853 A1 | 2/2004 | | |
| EP | 2713281 | 4/2004 | | |
| EP | 1517464 A2 | 3/2005 | | |
| EP | 1416687 B1 | 8/2006 | | |
| EP | 1410686 | 3/2008 | | |
| EP | 2043381 A2 | 4/2009 | | |
| EP | 2161950 A2 | 3/2010 | | |
| EP | 0742674 B1 | 4/2014 | | |
| EP | 2591617 B1 | 6/2014 | | |
| GB | 2284327 A | 5/1995 | | |
| GB | 2338374 A * | 12/1999 | | |
| GB | 2379533 A | 3/2003 | | |
| GB | 2486183 | 6/2012 | | |
| JP | 63269633 | 11/1988 | | |
| JP | 07210129 A * | 8/1995 | | |
| JP | 2000149391 A | 5/2000 | | |
| JP | 2001034951 A * | 2/2001 | | |
| JP | 2002111817 | 4/2002 | | |
| JP | 2002123267 A | 4/2002 | | |
| JP | 2002358241 A | 12/2002 | | |
| JP | 2003037585 A | 2/2003 | | |
| JP | 2003506765 A | 2/2003 | | |
| JP | 2003101958 | 4/2003 | | |
| JP | 2003169089 A | 6/2003 | | |
| JP | 2005108427 A * | 4/2005 | | |
| JP | 2005136457 | 5/2005 | | |
| JP | 2007241652 A | 9/2007 | | |
| JP | 2009506603 A | 2/2009 | | |
| JP | 2009075540 A | 4/2009 | | |
| JP | 2009135750 | 6/2009 | | |
| JP | 2009535708 | 10/2009 | | |
| JP | 2009538006 A | 10/2009 | | |
| JP | 2011130496 | 6/2011 | | |
| NL | WO 0106455 A1 * | 1/2001 | ........... | G06T 1/0021 |
| TW | 439027 | 6/2001 | | |
| WO | 9525313 | 9/1995 | | |
| WO | 9923560 | 5/1999 | | |
| WO | 9961985 | 12/1999 | | |
| WO | 0019693 A1 | 4/2000 | | |
| WO | 0110125 A1 | 2/2001 | | |
| WO | 0153994 | 7/2001 | | |
| WO | 02073851 | 9/2002 | | |
| WO | 03093950 A2 | 11/2003 | | |
| WO | 2005013047 | 2/2005 | | |
| WO | 2007023120 A1 | 3/2007 | | |
| WO | 2007127485 | 11/2007 | | |
| WO | 2007131555 | 11/2007 | | |
| WO | 2007135581 A2 | 11/2007 | | |
| WO | 2008082350 A1 | 7/2008 | | |
| WO | 2008114389 A1 | 9/2008 | | |
| WO | 2012050927 | 4/2012 | | |
| WO | 2014/004182 | 1/2014 | | |
| WO | 2014149533 A2 | 9/2014 | | |

OTHER PUBLICATIONS

United Patent and Trademark Office, "Notice of Allowance", issued in connection with U.S. Appl. No. 13/827,653, mailed on Mar. 6, 2014, 31 pages.

Akyildiz I.F., et al., "Multimedia Group Synchronization Protocols for Integrated Services Networks," IEEE Journal on Selected Areas in Communications, 1996, pp. 162-173, vol. 14 (1).

Biersack E., et al., "Intra- and Inter-Stream Synchronisation for Stored Multimedia Streams," IEEE International Conference on Multimedia Computing and Systems, 1996, pp. 1-10.

International Search Report for Application No. PCT/US04/23102, mailed on Aug. 1, 2008, 7 pages.

(56) References Cited

OTHER PUBLICATIONS

Motorola., "Simplefi, Wireless Digital Audio Receiver, Installation and User Guide", Dec. 31, 2001.
Park S., et al., "Group Synchronization in MultiCast Media Communications," Proceedings of the 5th Research on Multicast Technology Workshop, 2003.
PRISMIQ; Inc., "PRISMIQ Media Player User Guide", 2003, 44 pages.
Rothermel K., et al., "An Adaptive Stream Synchronization Protocol," 5th International Workshop on Network and Operating System Support for Digital Audio and Video, 1995.
Schulzrinne H., et al., "RTP: A Transport Protocol for Real-Time Applications, RFC 3550," Network Working Group, 2003, pp. 1-89.
The MPEG-2 Transport Stream. Retrieved from the Internet< URL: http://www.coolstf.com/mpeg/#ts>., last visited Mar. 3, 2013, pp. 1-5.
Voyetra; Turtle Beach Inc., "AudioTron Quick Start Guide, Version 1.0", Mar. 2001, 24 pages.
Voyetra; Turtle Beach Inc., "AudioTron Reference Manual, Version 3.0", May 2002, 70 pages.
Voyetra; Turtle Beach Inc., "AudioTron Setup Guide, Version 3.0", May 2002, 38 pages.
United States Patent and Trademark Office, "Final Office Action", issued in connection with U.S. Appl. No. 10/816,217, mailed on Jul. 13, 2009,16 pages.
United States Patent and Trademark Office, "Final Office Action", issued in connection with U.S. Appl. No. 13/297,000, mailed on Sep. 13, 2012,17 pages.
United States Patent and Trademark Office, "Final Office Action", issued in connection with U.S. Appl. No. 10/816,217, mailed on Oct. 21, 2011, 19 pages.
United States Patent and Trademark Office, "Final Office Action", issued in connection with U.S. Appl. No. 10/816,217, mailed on Jan. 28, 2011, 21 pages.
United States Patent and Trademark Office, "Final Office Action", issued in connection with U.S. Appl. No. 10/816,217, mailed on Jun. 30, 2008, 30 pages.
International Bureau,"Search Report" issued in connection with International Patent application No. PCT/US2013/046372, mailed on Aug. 26, 2013, 3 pages.
International Bureau,"Written opinion" issued in connection with International Patent application No. PCT/US2013/046372, mailed on Aug. 26, 2013, 4 pages.
International Bureau,"Search Report", issued in connection with PCT Application No. PCT/US2013/046386, mailed on Sep. 30, 2013, 3 pages.
M. Nilsson., "ID3 Tag Version 2", Mar. 26, 1998, 28 Pages.
United States Patent and Trademark Office, "Non-final Office Action", issued in connection with U.S. Appl. No. 13/619,237, mailed Apr. 10, 2013,10 pages.
United States Patent and Trademark Office, "Non-Final Office Action", issued in connection with U.S. Appl. No. 10/816,217, mailed on Jan. 18, 2008, 38 pages.
United States Patent and Trademark Office, "Non-Final Office Action", issued in connection with U.S. Appl. No. 10/816,217, mailed on Jun. 21, 2011, 13 pages.
United States Patent and Trademark Office, "Non-Final Office Action", issued in connection with U.S. Appl. No. 10/816,217, mailed on Jan. 22, 2009,18 pages.
United States Patent and Trademark Office, "Non-Final Office Action", issued in connection with U.S. Appl. No. 10/816,217, mailed on Jun. 25, 2010, 17 pages.
United States Patent and Trademark Office,"Non-Final Office Action", issued in connection with U.S. Appl. No. 13/533,105, mailed on Nov. 25, 201, 19 pages.
United States Patent and Trademark Office, "Non-Final Office Action", issued in connection with U.S. Appl. No. 13/297,000, mailed on Feb. 29, 2012, 10 pages.
United States Patent and Trademark Office, "Notice of Allowability", issued in connection with U.S. Appl. No. 13/619,237, mailed on Sep. 6, 2013, 4 pages.
United States Patent and Trademark Office, "Notice of Allowance", issued in connection with U.S. Appl. No. 10/816,217, mailed on Dec. 27, 2011, 15 pages.
"Polycom Conference Composer manual: copyright 2001", 29 pages.
"UPnP; "Universal Plug and Play Device Architecture"; Jun. 8, 2000; version 1.0; Microsoft Corporation; pp. 1-54".
International Bureau, "Written Opinion", issued in connection with PCT Application No. PCT/US2013/046386, mailed on Sep. 30, 2013, 6 pages.
"Yamaha DME 32 manual: copyright 2000", 296 pages.
United States Patent and Trademark Office, "Non-Final Rejection," issued in connection with U.S. Appl. No. 11/906,702, mailed on Aug. 20, 2009, 27 pages.
United States Patent and Trademark Office, "Final Rejection," issued in connection with U.S. Appl. No. 11/906,702, mailed on Jan. 21, 2010, 26 pages.
United States Patent and Trademark Office, "Notice of Allowance," issued in connection with U.S. Appl. No. 11/906,702, mailed on Nov. 10, 2011, 17 pages.
Benslimane, Abderrahim, "A Multimedia Synchronization Protocol for Multicast Groups," 2000, IEEE, Proceedings of the 26th Euromicro Conference, 2000, vol. 1, pp. 456-463.
Mills, David, "Precision Synchronization of Computer Networks Clocks," 1994, ACM Computer Communications Review, vol. 24, pp. 28-43.
Bretl et al., "MPEG2 Tutorial," 2000, www.bretl.com, retrieved http://www.bretl.com/mpeghtml/MPEGindex.htm on Jan. 2009, pp. 1-23.
Huang et al., A Synchronization Infrastructure for Multicast Multimedia at the Presentation layer, IEEE Transacations on Consumer Electronics, vol. 43, No. 3, Aug. 1997.
Ishibashi et al., A Group Synchronization Mechanism for Stored Media in Multicast Communications, IEEE, 1997.
Ishibashi et al., A Group Synchronization Mechanism for Live Media in Multicast Communications, IEEE, 1997.
Jo et al., "Synchronized One-to-Many Media Streaming with Adaptive Playout Control," In: Proceedings of SPIE, vol. 4861, Edited by Tescher et al., Dec. 2002, pp. 71-82.
Mills, David L., "Network Time Protocol Specification, Implementation and Analysis," Request for Comments: 1305, Network Working Group, Mar. 1992.
United States Patent and Trademark Office, "Notice of Allowance," issued in connection with U.S. Appl. No. 13/298,090, mailed on Jan. 31, 2013, 39 pages.
United States Patent and Trademark Office, "Final Office Action," issued in connection with U.S. Appl. No. 13/298,090, mailed on Jul. 3, 2012, 45 pages.
United States Patent and Trademark Office, "Non-Final Office Action," issued in connection with U.S. Appl. No. 13/298,090, mailed on Jan. 5, 2012, 40 pages.
Blakowski G. et al., "A Media Synchronization Survey: Reference Model, Specification, and Case Studies", Jan. 1996, vol. 14, No. 1, 5-35 pages.
European Patent Office, "European Extended Search Report", issued in connection with Eropean patent Application No. 13184747.7 mailed on Feb. 28, 2014, 8 pages.
The United States Patent and Trademark Office, "Final Office Action", issued in connection with U.S. Appl. No. 13/907,666, mailed on Jun. 5, 2014, 12 pages.
The United States Patent and Trademark Office, "Final Office Action", issued in connection with U.S. Appl. No. 13/533,105, mailed on Mar. 27, 2014, 29 pages.
Japanese Intellectual Property Office, "Decision of Rejection," issued in connection with Japanese patent application No. 2012-178711, mailed on Jul. 8, 2014, 3 pages.
Japanese Intellectual Property Office, "Office Action Summary," issued in connection with Japanese patent application No. 2012-178711, mailed on Nov. 19, 2013, 5 pages.

(56) References Cited

OTHER PUBLICATIONS

Maniactools, "Identify Duplicate Files by Sound," retrieved from the internet http://www.maniactools.com/soft/music-duplicate-remover/identify-duplicate-files-by-sound.shtml, last visited on Sep. 28, 2010, 2 pages.
The United States Patent and Trademark Office,"Non-Final Office Action", issued in connection with U.S. Appl. No. 14/184,522, mailed on May 1, 2014, 31 pages.
The United States Patent and Trademark Office,"Non-Final Office Action", issued in connection with U.S. Appl. No. 13/705,176, mailed on May 6, 2014, 23 pages.
The United States Patent and Trademark Office,"Non-Final Office Action", issued in connection with U.S. Appl. No. 14/184,528, mailed May 12, 2014, 23 pages.
The United States Patent and Trademark Office, "Non-Final Office Action", issued in connection with U.S. Appl. No. 13/848,932, mailed on May 14, 2014, 14 pages.
The United States Patent and Trademark Office, "Non-Final Office Action", issued in connection with U.S. Appl. No. 14/176,808, mailed on Jun. 17, 2014, 6 pages.
The United States Patent and Trademark Office, "Non-Final Office Action", issued in connection with U.S. Appl. No. 13/907,666, mailed on Dec. 18, 2013, 12 pages.
The United States Patent and Trademark Office, "Non-Final Office Action", issued in connection with U.S. Appl. No. 13/724,048, mailed on Mar. 19, 2013, 9 pages.
The United States Patent and Trademark Office, "Non-Final Office Action", issued in connection with U.S. Appl. No. 14/184,526, mailed on Jul. 25, 2014, 9 pages.
The United States Patent and Trademark Office,"Non-Final Office Action", issued in connection with U.S. Appl. No. 14/186,850, mailed on May 27, 2014, 13 pages.
The United States Patent and Trademark Office,"Non-Final Office Action", issued in connection with U.S. Appl. No. 13/204,511, mailed on Apr. 30, 2012, 30 pages.
The United States Patent and Trademark Office,"Non-Final Office Action", issued in connection with U.S. Appl. No. 13/724,048, mailed on Jul. 30, 2013, 7 pages.
The United States Patent and Trademark Office, "Non-Final Office Action", issued in connection with U.S. Appl. No. 13/533,105, mailed on Jul. 31, 2014, 19 pages.
The United States Patent and Trademark Office, "Notice of Allowance", issued in connection with U.S. Appl. No. 13/724,048, mailed on Nov. 13, 2013, 7 pages.
The United States Patent and Trademark Office,"Notice of Allowance", issued in connection with U.S. Appl. No. 13/204,511, mailed on Oct. 5, 2012, 21 pages.
Yamaha, "Yamaha DME Designer software manual", Copyright 2004, 482 pages.
The United States Patent and Trademark Office, "Non-Final Office action", issued in connection with U.S. Appl. No. 11/801,468, mailed on Apr. 19, 2010, 16 pages.
The United States Patent and Trademark Office, "Non-Final Office action", issued in connection with U.S. Appl. No. 11/801,468, mailed on Nov. 29, 2010, 17 pages.
The United States Patent and Trademark Office, "Notice of Allowance", issued in connection with U.S. Appl. No. 11/801,468, mailed on May 6, 2011, 10 pages.
The United States Patent and Trademark Office, "Advisory Action", issued in connection with U.S. Appl. No. 10/816,217, mailed on Sep. 18, 2008, 8 pages.
United States Patent and Trademark Office, "Advisory Action", issued in connection with U.S. Appl. No. 13/907,666, mailed on Sep. 5, 2014, 3 pages.
Bluetooth, "Specification of the Bluetooth System: The ad hoc SCATTERNET for affordable and highly functional wireless connectivity" Core, Version 1.0 A, Jul. 26, 1999, 1068 pages.(Document uploaded in 7 different files: NPL2_part1 pp. 1 to 150, NPL2_part2 pp. 151 to 300, NPL2_part3 pp. 301 to 450, NPL2_part4 pp. 451 to 600,NPL2_part5 pp. 601 to 750, NPL2_part6 pp. 751 to 900 and NPL2_part7 pp. 901 to 1068).
Bluetooth. "Specification of the Bluetooth System: Wireless connections made easy" Core, Version 1.0 B, Dec. 1, 1999, 1081 pages.(Document uploaded in 8 different files: NPL3_part1 pp. 1 to 150, NPL3_part2 pp. 151 to 303, NPL3_part3 pp. 304 to 453, NPL3_part4 pp. 454 to 603,NPL3_part5 pp. 604 to 703, NPL3_part6 pp. 704 to 854 and NPL3_part7 pp. 855 to 1005, NPL3_part8 pp. 1006 to 1081).
Dell, Inc., "Dell Digital Audio Receiver: Reference Guide", Jun. 2000, 70 pages.
Dell, Inc., "Start Here", Jun. 2000, 2 pages.
United States Patent and Trademark Office, "Final Office Action", issued in connection with U.S. Appl. No. 14/186,850, mailed on Oct. 22, 2014, 12 pages.
United States Patent and Trademark Office, "Final Office Action", issued in connection with U.S. Appl. No. 13/705,176, mailed on Oct. 23, 2014, 23 pages.
Jones, Stephen, "Dell Digital Audio Receiver: Digital upgrade for your analog stereo" Analog Stereo, Jun. 24, 2000 < http:www.reviewsonline.com/articles/961906864.htm> retrieved Jun. 18, 2014, 2 pages.
Louderback, Jim, "Affordable Audio Receiver Furnishes Homes With MP3",TechTV Vault, Jun. 28, 2000 <http:// www.g4tv.com/articles/17923/affordable-audio-receiver-furnishes-homes-with-mp3/> retrieved Jul. 10, 2014, 2 pages.
United States Patent and Trademark Office, "Non-Final Office Action", issued in connection with U.S. Appl. No. 14/184,935, mailed on Jul. 25, 2014, 11 pages.
United States Patent and Trademark Office, "Non-Final Office Action", issued in connection with U.S. Appl. No. 13/848,904, mailed on Oct. 23, 2014, 11 pages.
United States Patent and Trademark Office, "Non-Final Office Action", issued in connection with U.S. Appl. No. 13/864,251, mailed on Oct. 23, 2014, 9 pages.
United States Patent and Trademark Office, "Non-Final Office Action", issued in connection with U.S. Appl. No. 13/888,203, mailed on Oct. 23, 2014, 9 pages.
United States Patent and Trademark Office, "Non-Final Office Action", issued in connection with U.S. Appl. No. 13/435,776, mailed on Oct. 24, 2014, 14 pages.
United States Patent and Trademark Office, "Notice of Allowance", issued in connection with U.S. Appl. No. 14/176,808, mailed on Sep. 25, 2014, 5 pages.
Palm, Inc., "Handbook for the Palm VII Handheld", May 2000, 311 pages.
Apple, "Welcome. You're watching Apple TV." Apple TV 1st Generation Setup Guide, Apr. 8, 2008 <http://manuals.info.apple.com/MANUALS/0/MA403/en_US/AppleTV_SetupGuide.pdf> Retrieved Oct. 14, 2014, 40 pages.
Apple, "Welcome. You're watching Apple TV." Apple TV 2nd Generation Setup Guide, Mar. 10, 2011 <http://manuals.info.apple.com/Manuals/1000/MA1555/en_US/Apple_TV_2nd_gen_Setup_Guide.pdf> Retrieved Oct. 16, 2014, 36 pages.
Apple, "Welcome. You're watching Apple TV." Apple TV 3rd Generation Setup Guide, Mar. 16, 2012 <http://http://manuals.info.apple.com/Manuals/1000/MA1607/en_US/apple_tv_3rd_gen_setup.pdf> Retrieved Oct. 16, 2014, 36 pages.
Higgins et al., "Presentations at WinHEC 2000" May 2000, 138 pages.
United States Patent and Trademark Office, "Advisory Action," issued in connection with U.S. Appl. No. 14/516,867, mailed on Jun. 1, 2015, 11 pages.
Baldwin, Roberto, "How-To: Setup iTunes DJ on Your Mac and iPhone", available at http://www.maclife.com/article/howtos/howto_setup_itunes_dj_your_mac_and_iphone, archived on Mar. 17, 2009, 4 pages.
United States Patent and Trademark Office, "Final Office Action," issued in connection with U.S. Appl. No. 14/184,522, mailed on Jun. 15, 2015, 25 pages.
United States Patent and Trademark Office, "Non-Final Office Action," issued in connection with U.S. Appl. No. 13/848,932, mailed on Jun. 12, 2015, 16 pages.

(56) References Cited

OTHER PUBLICATIONS

United States Patent and Trademark Office, "Non-Final Office Action," issued in connection with U.S. Appl. No. 13/533,105, mailed on Jun. 19, 2015, 38 pages.
United States Patent and Trademark Office, "Non-Final Office Action," issued in connection with U.S. Appl. No. 13/705,176, mailed on Jun. 23, 2015, 30 pages.
United States Patent and Trademark Office, "Non-Final Office Action," issued in connection with U.S. Appl. No. 14/564,544, mailed on Jun. 3, 2015, 7 pages.
United States Patent and Trademark Office, "Non-Final Office Action," issued in connection with U.S. Appl. No. 13/871,795, mailed on Jun. 4, 2015, 16 pages.
United States Patent and Trademark Office, "Notice of Allowance," issued in connection with U.S. Appl. No. 13/848,904, mailed on Jul. 2, 2015, 17 pages.
United States Patent and Trademark Office, "Notice of Allowance," issued in connection with U.S. Appl. No. 13/888,203, mailed on Jul. 2, 2015, 19 pages.
United States Patent and Trademark Office, "Notice of Allowance," issued in connection with U.S. Appl. No. 14/184,935, mailed on Jul. 2, 2015, 23 pages.
United States Patent and Trademark Office, "Notice of Allowance," issued in connection with U.S. Appl. No. 13/297,000, mailed on Jul. 6, 2015, 24 pages.
United States Patent and Trademark Office, "Advisory Action", issued in connection with U.S. Appl. No. 14/184,526, mailed on Apr. 15, 2015, 9 pages.
United States Patent and Trademark Office, "Advisory Action", issued in connection with U.S. Appl. No. 14/184,935, mailed on Apr. 15, 2015, 9 pages.
European Patent Office, "European Extended Search Report", issued in connection with Application No. 14181454.1 mailed on Mar. 31, 2015, 9 pages.
United States Patent and Trademark Office,"Final Office Action", issued in connection with U.S. Appl. No. 14/186,850, mailed on Apr. 28, 2015, 20 pages.
United States Patent and Trademark Office, "Notice of Allowance", issued in connection with U.S. Appl. No. 13/907,666, mailed on May 19, 2015, 7 pages.
United States Patent and Trademark Office,"Re-Exam Non-Final Office Action", issued in connection with U.S. Appl. No. 90/013,423, mailed on Apr. 22, 2015,16 pages.
The United States Patent and Trademark Office, "Advisory Action", issued in connection with U.S. Appl. No. 13/907,666, mailed on Nov. 12, 2014, 6 pages.
The United States Patent and Trademark Office,"Advisory Action", issued in connection with U.S. Appl. No. 14/186,850, mailed on Nov. 26, 2014, 9 pages.
The United States Patent and Trademark Office,"Advisory Action", issued in connection with U.S. Appl. No. 13/705,176, mailed on Jan. 8, 2015, 4 pages.
Crown, "Crown PIP Manual", available for sale at least 2004, 68 pages.
The United States Patent and Trademark Office, "Final Office Action", issued in connection with U.S. Appl. No. 13/533,105, mailed on Dec. 17, 2014, 36 pages.
The United States Patent and Trademark Office, "Final Office Action", issued in connection with U.S. Appl. No. 14/184,528, mailed on Dec. 3, 2014, 12 pages.
The United States Patent and Trademark Office, "Final Office Action", issued in connection with U.S. Appl. No. 13/848,932, mailed on Jan. 7, 2015, 14 pages.
The United States Patent and Trademark Office, "Non-Final Office Action", issued in connection with U.S. Appl. No. 14/516,867,mailed on Dec. 1, 2014,11 pages.
The United States Patent and Trademark Office, "Non-Final Office Action", issued in connection with U.S. Appl. No. 13/864,247, mailed on Nov. 17, 2014, 11 pages.

The United States Patent and Trademark Office, "Non-Final Office Action", issued in connection with U.S. Appl. No. 13/435,739, mailed on Nov. 18, 2014, 10 pages.
The United States Patent and Trademark Office, "Non-Final Office Action",issued in connection with U.S. Appl. No. 13/848,921, mailed on Nov. 19, 2014, 9 pages.
Renkus Heinz, "Manual", available for sale at least 2004, 6 pages.
United States Patent and Trademark Office, "Advisory Action", issued in connection with U.S. Appl. No. 13/848,932, mailed on Mar. 2, 2015, 3 pages.
United States Patent and Trademark Office, "Advisory Action", issued in connection with U.S. Appl. No. 13/533,105, mailed on Mar. 25, 2015, 5 pages.
United States Patent and Trademark Office, "Advisory Action", issued in connection with U.S. Appl. No. 14/184,528, mailed on Feb. 26, 2015, 3 pages.
United States Patent and Trademark Office, "Final Office Action", issued in connection with U.S. Appl. No. 14/184,526, mailed on Feb. 11, 2015,13 pages.
United States Patent and Trademark Office, "Final Office Action", issued in connection with U.S. Appl. No. 14/184,935, mailed on Feb. 11, 2015,17 pages.
United States Patent and Trademark Office, "Final Office Action", issued in connection with U.S. Appl. No. 14/184,522, mailed on Feb. 12, 2015, 20 pages.
United States Patent and Trademark Office, "Non-Final Office Action", issued in connection with U.S. Appl. No. 14/184,528, mailed on Mar. 26, 2015, 18 pages.
United States Patent and Trademark Office, "Final Office Action", issued in connection with U.S. Appl. No. 13/864,251, mailed on Mar. 3, 2015,13 pages.
United States Patent and Trademark Office, "Final Office Action", issued in connection with U.S. Appl. No. 13/848,904, mailed on Mar. 4, 2015,16 pages.
United States Patent and Trademark Office, "Final Office Action", issued in connection with U.S. Appl. No. 13/888,203, mailed on Mar. 5, 2015,13 pages.
United States Patent and Trademark Office, "Final Office Action", issued in connection with U.S. Appl. No. 14/516,867, mailed on Mar. 9, 2015, 14 pages.
International Bureau,"International Preliminary Report on Patentability" issued in connection with International Patent application No. PCT/US2013/046372, mailed Dec. 31, 2014, 5 pages.
International Bureau,"International Preliminary Report on Patentability and Written Opinion", issued by the in connection with International Patent Application No. PCT/US2013/046386, mailed on Jan. 8, 2015, 8 pages.
United States Patent and Trademark Office, "Non-Final Office Action", issued in connection with U.S. Appl. No. 13/705,174, mailed on Mar. 12, 2015, 13 pages.
United States Patent and Trademark Office, "Non-Final Office Action", issued in connection with U.S. Appl. No. 13/705,177, mailed on Mar. 13, 2015, 15 pages.
United States Patent and Trademark Office, "Non-Final Office Action", issued in connection with U.S. Appl. No. 14/186,850, mailed on Feb. 26, 2015, 25 pages.
United States Patent and Trademark Office, "Non-Final Office Action", issued in connection with U.S. Appl. No. 13/705,178,mailed on Mar. 27, 2015, 14 pages.
United States Patent and Trademark Office,"Non-Final Office Action", issued in connection with U.S. Appl. No. 14/504,812, mailed on Jan. 30, 2015,13 pages.
United States Patent and Trademark Office, "Non-Final Office Action", issued in connection with U.S. Appl. No. 13/435,776, mailed on Mar. 4, 2015, 16 pages.
United States Patent and Trademark Office, "Pre-Interview First Office Action" issued in connection with U.S. Appl. No. 14/505,027, mailed on Mar. 10, 2015, 4 pages.
"Advisory Action mailed Jul. 28, 2015, issued in connection with U.S. Appl. No. 14/184,522, filed Feb. 19, 2014, 7 pages".
"Baudisch et al., "Flat Volume Control: Improving Usability by Hiding the Volume Control Hierarchy in the User Interface", 2004, 8 pages."

(56) References Cited

OTHER PUBLICATIONS

"Chakrabarti et al., "A Remotely Controlled Bluetooth Enabled Environment", IEEE, 2004, pp. 77-81."
"Schmandt et al., "Impromptu: Managing Networked Audio Applications for Mobile Users", 2004, 11 pages."
"Corrected Notice of Allowance mailed on Aug. 19, 2015, issued in connection with U.S. Appl. No. 13/907,666, filed May 31, 2013, 2 pages."
"Final Office Action mailed on Aug. 11, 2015, issued in connection with U.S. Appl. No. 13/864,247, filed Apr. 17, 2013, 15 pages".
"Final Office Action mailed on Jul. 15, 2015, issued in connection with U.S. Appl. No. 14/504,812, filed Oct. 2, 2014, 18 pages".
"Final Office Action mailed on Aug. 3, 2015, issued in connection with U.S. Appl. No. 13/848,921, filed Mar. 22, 2013, 13 pages".
"Fulton et al., "The Network Audio System: Make Your Application Sing (As Well As Dance)!", The X Resource, 1994, 14 pages."
"Hans et al., "Interacting with Audio Streams for Entertainment and Communication", 2003, 7 pages."
"Levergood et al., "AudioFile: A Network-Transparent System for Distributed Audio Applications", Digital Equipment Corporation, 1993, 109 pages."
"Notice of Allowance mailed on Aug. 10, 2015, issued in connection with U.S. Appl. No. 13/848,904, filed Mar. 22, 2013, 9 pages".
"Notice of Allowance mailed on Aug. 12, 2015, issued in connection with U.S. Appl. No. 13/435,739, filed Mar. 30, 2012, 27 pages".
"Notice of Allowance mailed on Jul. 13, 2015, issued in connection with U.S. Appl. No. 14/184,526, filed Feb. 19, 2014, 22 pages".
"Notice of Allowance mailed on Jul. 15, 2015, issued in connection with U.S. Appl. No. 13/705,174, filed Dec. 5, 2012, 18 pages".
"Notice of Allowance mailed on Jul. 17, 2015, issued in connection with U.S. Appl. No. 13/864,251, filed Apr. 17, 2013, 20 pages".
"Notice of Allowance mailed on Aug. 27, 2015, issued in connection with U.S. Appl. No. 13/705,177, filed Dec. 5, 2012, 34 pages."
"Notice of Allowance mailed on Aug. 27, 2015, issued in connection with U.S. Appl. No. 14/505,027, filed Oct. 2, 2014, 18 pages."
"Notice of Allowance mailed on Jul. 29, 2015, issued in connection with U.S. Appl. No. 13/359,976, filed Jan. 27, 2012, 28 pages".
"Notice of Allowance mailed on Jul. 29, 2015, issued in connection with U.S. Appl. No. 14/186,850, filed Feb. 21, 2014, 9 pages".
"Notice of Allowance mailed on Jul. 30, 2015, issued in connection with U.S. Appl. No. 13/705,178, filed Dec. 5, 2012, 18 pages".
"Notice of Allowance mailed on Aug. 4, 2015, issued in connection with U.S. Appl. No. 14/516,867, filed Oct. 17, 2014, 13 pages".
"Notice of Allowance mailed on Aug. 5, 2015, issued in connection with U.S. Appl. No. 13/435,776, filed Mar. 30, 2012, 26 pages".
"Nutzel et al., "Sharing Systems for Future HiFi Systems", IEEE, 2004, 9 pages."
"Re-Exam Final Office Action mailed on Aug. 5, 2015, issued in connection with U.S. Appl. No. 90/013,423, filed Jan. 5, 2015, 25 pages."
"Notice of Allowance mailed on Sep. 21, 2015, issued in connection with U.S. Appl. No. 13/297,000, filed Nov. 15, 2011, 11 pages."
"Notice of Allowance mailed on Sep. 22, 2015, issued in connection with U.S. Appl. No. 13/888,203, filed May 6, 2013, 7 pages".
"Notice of Allowance mailed on Sep. 24, 2015, issued in connection with U.S. Appl. No. 13/705,174, filed Dec. 5, 2012, 7 pages."
"Notice of Allowance mailed on Sep. 24, 2015, issued in connection with U.S. Appl. No. 14/184,935, filed Feb. 20, 2014, 7 pages".
"Notice of Allowance mailed on Sep. 3, 2015, issued in connection with U.S. Appl. No. 13/705,174, filed Dec. 5, 2012, 4 pages."
"Notice of Rejection issued on Sep. 15, 2015 in connection with Japanese Patent Application No. 2014-220704, 7 pages".
Notice of Allowance mailed on Oct. 7, 2015, issued in connection with U.S. Appl. No. 14/184,526, filed Feb. 19, 2014, 7 pages.
Advisory Action mailed on Jan. 5, 2012, issued in connection with U.S. Appl. No. 12/035,112, filed Feb. 21, 2008, 3 pages.
Advisory Action mailed on Sep. 28, 2009, issued in connection with U.S. Appl. No. 10/816,217, filed Apr. 1, 2004, 4 pages.
Canadian Intellectual Property Office, Canadian Office Action mailed on Sep. 14, 2015, issued in connection with Canadian Patent Application No. 2,842,342, 2 pages.
"Creative, "Connecting Bluetooth Devices with Creative D200," http://support.creative.com/kb/ShowArticle.aspx?url=http://ask.creative.com:80/SRVS/CGI-BIN/WEBCGI.EXE/?St=106, E=0000000000396859016,K=9377,Sxi=8, VARSET=ws:http://us.creative.com,case=63350>, available on Nov. 28, 2011, 2 pages".
"Final Office Action mailed on Oct. 13, 2011, issued in connection with U.S. Appl. No. 12/035,112, filed Feb. 21, 2008, 10 pages."
First Action Interview Office Action Summary mailed on Apr. 15, 2015, issued in connection with U.S. Appl. No. 14/505,027, filed Oct. 2, 2014, 6 pages.
"Non-Final Office Action mailed on Mar. 10, 2011, issued in connection with U.S. Appl. No. 12/035,112, filed Feb. 21, 2008, 12 pages."
"Non-Final Office Action mailed on Feb. 18, 2009, issued in connection with U.S. Appl. No. 10/861,653, filed Jun. 5, 2004, 18 pages."
"Non-Final Office Action mailed on Jun. 27, 2008, issued in connection with U.S. Appl. No. 10/861,653, filed Jun. 5, 2004, 19 pages."
Notice of Allowance mailed on Oct. 9, 2015, issued in connection with U.S. Appl. No. 13/435,739, filed Mar. 30, 2012, 4 pages.
"Notice of Allowance mailed on Oct. 13, 2015, issued in connection with U.S. Appl. No. 13/864,251, filed Apr. 17, 2013, 7 pages."
"Notice of Allowance mailed on Jun. 14, 2012, issued in connection with U.S. Appl. No. 12/035,112, filed Feb. 21, 2008, 9 pages."
"Notice of Allowance mailed on Jun. 16, 2009, issued in connection with U.S. Appl. No. 10/861,653, filed Jun. 5, 2004, 11 pages."
Advisory Action mailed Feb. 2, 2016, issued in connection with U.S. Appl. No. 13/848,921, filed Mar. 22, 2013, 8 pages.
Advisory Action mailed on Feb. 1, 2016, issued in connection with U.S. Appl. No. 13/864,247, filed Apr. 17, 2013, 6 pages.
Final Office Action mailed on Nov. 30, 2015, issued in connection with U.S. Appl. No. 13/871,795, filed Apr. 26, 2013, 26 pages.
Non-Final Office Action mailed on Jan. 13, 2016, issued in connection with U.S. Appl. No. 14/184,528, filed Feb. 19, 2014, 14 pages.
Notice of Allowance mailed on Jan. 11, 2016, issued in connection with U.S. Appl. No. 14/565,544, filed Dec. 9, 2014, 5 pages.
Advisory Action mailed on Feb. 10, 2016, issued in connection with U.S. Appl. No. 13/871,795, filed Apr. 26, 2013, 3 pages.
European Extended Search Report mailed Mar. 7, 2016, issued in connection with EP Application No. 13810340.3, 9 pages.
Final Office Action mailed on Feb. 24, 2016, issued in connection with U.S. Appl. No. 13/871,795, filed Apr. 26, 2013, 28 pages.
Horwitz, Jeremy, "Logic3 i-Station25," retrieved from the Internet: http://www.ilounge.com/index.php/reviews/entry/logic3-i-station25/, last visited Dec. 17, 2013, 5 pages.
International Bureau, International Preliminary Report on Patentability mailed on Jan. 30, 2014, issued in connection with International Application No. PCT/US2012/045894, filed on Jul. 9, 2012, 6 pages.
International Searching Authority, International Search Report mailed on Dec. 26, 2012, issued in connection with International Application No. PCT/US2012/045894, filed Jul. 9, 2012, 3 pages.
International Searching Authority, Written Opinion mailed on Dec. 26, 2012, issued in connection with International Application No. PCT/US2012/045894, filed on Jul. 9, 2012, 4 pages.
Japanese Intellectual Property Office, Office Action Summary mailed on Feb. 2, 2016, issued in connection with Japanese Patent Application No. 2015-520286, 6 pages.
Japanese Patent Office, Notice of Rejection, mailed on Feb. 3, 2015, issued in connection with Japanese Patent Application No. 2014-521648, 7 pages.
Roland Corporation, "Roland announces BA-55 Portable PA System," press release, Apr. 6, 2011, 2 pages.
Final Office Action mailed Nov. 18, 2015, issued in connection with U.S. Appl. No. 13/533,105, filed Jun. 26, 2012, 56 pages.
Canadian Intellectual Property Office, Canadian Office Action mailed on Apr. 4, 2016, issued in connection with Canadian Patent Application No. 2,842,342, 5 pages.

(56) References Cited

OTHER PUBLICATIONS

European Patent Office, Examination Report mailed on Mar. 22, 2016, issued in connection with European Patent Application No. EP14181454.1, 6 pages.
Falcone, John, "Sonos BU150 Digital Music System review," CNET, CNET [online] Jul. 27, 2009 [retrieved on Mar. 16, 2016], 11 pages Retrieved from the Internet: URL:http://www.cnet.com/products/sonos-bu150-digital-music-system/.
Japanese Patent Office, Office Action mailed on Mar. 29, 2016, issued in connection with Japanese Patent Application No. JP2015-520288, 12 pages.
Non-Final Office Action mailed on Mar. 8, 2016, issued in connection with U.S. Appl. No. 13/848,921, filed Mar. 22, 2013, 13 pages.
Notice of Allowance mailed on Apr. 7, 2016, issued in connection with U.S. Appl. No. 13/533,105, filed Jun. 26, 2012, 40 pages.
Notice of Allowance mailed on Apr. 11, 2016, issued in connection with U.S. Appl. No. 13/864,247, filed Apr. 17, 2013, 21 pages.
Japanese Patent Office, Office Action mailed on May 24, 2016, issued in connection with Japanese Patent Application No. 2014-220704, 7 pages.
Advisory Action mailed on Jun. 9, 2016, issued in connection with U.S. Appl. No. 13/871,795, filed Apr. 25, 2013, 14 pages.
Final Office Action mailed on Jun. 3, 2016, issued in connection with U.S. Appl. No. 13/705,176, filed Dec. 5, 2012, 24 pages.
Non-Final Office Action mailed on Jun. 1, 2016, issued in connection with U.S. Appl. No. 14/184,522, filed Feb. 19, 2014, 21 pages.
Non-Final Office Action mailed on May 10, 2016, issued in connection with U.S. Appl. No. 14/504,812, filed Oct. 2, 2014, 22 pages.
"884+ Automatic Matrix Mixer Control System," Ivie Technologies, Inc., 2000, pp. 1-4.
Barham et al., "Wide Area Audio Synchronisation", University of Cambridge Computer Laboratory, 1995, 5 pages.
Brassil et al., "Enhancing Internet Streaming Media with Cueing Protocols", 2000, 9 pages.
Cen et al., "A Distributed Real-Time MPEG Video Audio Player", Department of Computer Science and Engineering. Oregon Graduate Institute of Science and Technology, 1995, 12 pages.
Chinese Patent Office, Office Action dated Jul. 5, 2016, issued in connection with Chinese Patent Application No. 201380044380.2, 25 pages.
Dannenberg et al., "A. System Supporting Flexible Distributed Real-Time Music Processing", Proceedings of the 2001 International Computer Music Conference, 2001, 4 pages.
Dannenberg; Roger B., "Remote Access to Interactive Media", Proceedings of the SPIE 1785, 1993, 230-237.
Day, Rebecca, "Going Elan!" Primedia Inc., 2003, 4 pages.
Fober et al., "Clock Skew Compensation over a High Latency Network," Proceedings of the ICMC, 2002, pp. 548-552.
Ishibashi et al., "A Comparison of Media Synchronization Quality Among Reactive Control Schemes," IEEE Infocom, 2001, pp. 77-84.
"A/V Surround Receiver AVR-5800," Denon Electronics, 2000, 2 pages.
"A/V System Controleer, Owner's Manual," B&K Compontents, Ltd., 1998, 52 pages.
"DP-0206 Digital Signal Processor," TOA Electronics, Inc., 2001, pp. 1-12.
"Home Theater Control Systems," Cinema Source, 2002, 19 pages.
"Model MRC44 Four Zone—Four Source Audio/Video Controller/Amplifier System," Xantech Corporation, 2002, 52 pages.
"NexSys Software v. 3 Manual," Crest Audio, Inc., 1997, 76 pages.
"Residential Distributed Audio Wiring Practices," Leviton Network Solutions, 2001, 13 pages.
"RVL-6 Modular Multi-Room Controller, Installation & Operation Guide," Nile Audio Corporations, 1999, 46 pages.
"Systemline Modular Installation Guide, Multiroom System," Systemline, 2003, pp. 1-22.
"ZR-8630AV MultiZone Audio/Video Receiver, Installation and Operation Guide," Niles Audio Corporation, 2003, 86 pages.

ZX135: Installation Manual, LA Audio, Apr. 2003, 44 pages.
Lienhart et al., "On the Importance of Exact Synchronization for Distributed Audio Signal Processing", Session L: Poster Session II—ICASSP'03 Papers, 2002, 1 page.
Liu et al., "A synchronization control scheme for real-time streaming multimedia applications"Packet Video. 2003, 10 pages, vol. 2003.
Liu et al., "Adaptive Delay Concealment for Internet Voice Applications with Packet-Based Time-Scale Modification." Information Technologies 2000, pp. 91-102.
Non-Final Office Action dated Sep. 7, 2016, issued in connection with U.S. Appl. No. 13/864,248, filed Apr. 17, 2013, 12 pages.
Non-Final Office Action dated Aug. 9, 2016, issued in connection with U.S. Appl. No. 13/871,795, filed Apr. 26, 2013, 31 pages.
Notice of Allowance for U.S. Appl. No. 14/505,027 dated Aug. 27, 2015, 19 pages.
Pillai et al., "A Method to Improve the Robustness of MPEG Video Applications over Wireless Networks", Kent Ridge Digital Labs, 2000, 15 pages.
Rangan et al., "Feedback Techniques for Continuity and Synchronization in Multimedia Information Retrieval", ACM Transactions on Information Systems, 1995, 13(2), 145-176.
Reid, Mark, "Multimedia conferencing over ISDN and IP networks using ITU-T H-series recommendations: architecture, control and coordination," Computer Networks, 1999, vol. 31, pp. 225-235.
Rothermel et al., "An Adaptive Protocol for Synchronizing Media Streams", Institute of Parallel and Distributed High-Performance Systems (IPVR), 1997, 26 pages.
Rothermel et al., "An Adaptive Stream Synchronization Protocol," 5th International Workshop on Network and Operating System Support for Digital Audio and Video, Apr. 18-21, 1995, 12 pages.
Rothermel et al., "Synchronization in Joint-Viewing Environments", University of Stuttgart Institute of Parallel and Distributed High-Performance Systems, 1992, 13 pages.
*Sonos, Inc.* v. *D&M Holdings Inc. et al.*, Defendant's Initial Invalidity Contentions Exhibit 1: Defendants' Invalidity Contentions for U.S. Pat. No. 7,571,014 filed Apr. 15, 2016, 161 pages.
*Sonos, Inc.* v. *D&M Holdings Inc. et al.*, Defendant's Initial Invalidity Contentions Exhibit 10: Defendants' Invalidity Contentions for U.S. Pat. No. 9,213,357 filed Apr. 15, 2016, 244 pages.
*Sonos, Inc.* v. *D&M Holdings Inc. et al.*, Defendants Initial Invalidity Contentions Exhibit 2: Defendants' Invalidity Contentions for U.S. Pat. No. 8,588,949 filed Apr. 15, 2016, 112 pages.
*Sonos, Inc.* v. *D&M Holdings Inc. et al.*, Defendants Initial Invalidity Contentions Exhibit 5: Defendants' Invalidity Contentions for U.S. Pat. No. 8,938,637 filed Apr. 15, 2016, 177 pages.
*Sonos, Inc.* v. *D&M Holdings Inc. et al.*, Defendants Initial Invalidity Contentions Exhibit 8: Defendants' Invalidity Contentions for U.S. Pat. No. 9,195,258 filed Apr. 15, 2016, 400 pages.
Taylor, Marilou, "Long Island Sound," Audio Video Interiors, Apr. 2000, 8 pages.
LG: RJP-201M Remote Jack Pack Installation and Setup Guide, 2010, 24 pages.
LinkSys by Cisco, Wireless Home Audio Controller, Wireless-N Touchscreen Remote DMRW1000 Datasheet, Copyright 2008, 2 pages.
LinkSys by Cisco, Wireless Home Audio Controller, Wireless-N Touchscreen Remote DMRW1000 User Guide, Copyright 2008, 64 pages.
LinkSys by Cisco, Wireless Home Audio Player, Wireless-N Music Extender DMP100 Quick Installation Guide, Copyright 2009, 32 pages.
LinkSys by Cisco, Wireless Home Audio Player, Wireless-N Music Extender DMP100 User Guide, Copyright 2008, 65 pages.
Liu et al., "A synchronization control scheme for real-time streaming multimedia applications," Packet Video. 2003, 10 pages, vol. 2003.
Parasound Zpre2 Zone Preamplifier with PTZI Remote Control, 2005, 16 pages.
Proficient Audio Systems M6 Quick Start Guide, 2011, 5 pages.
Proficient Audio Systems: Proficient Editor Advanced Programming Guide, 2007, 40 pages.

(56) References Cited

OTHER PUBLICATIONS

Programming Interface for WL54040 Dual-Band Wireless Transceiver, AVAGO0066, Agere Systems, May 2004, 16 pages.
Radio Shack, "Auto-Sensing 4-Way Audio/Video Selector Switch", 2004, 1 page.
RadioShack, Pro-2053 Scanner, 2002 Catalog, part 1, 100 pages.
RadioShack, Pro-2053 Scanner, 2002 Catalog, part 2, 100 pages.
RadioShack, Pro-2053 Scanner, 2002 Catalog, part 3, 100 pages.
RadioShack, Pro-2053 Scanner, 2002 Catalog, part 4, 100 pages.
RadioShack, Pro-2053 Scanner, 2002 Catalog, part 5, 46 pages.
*Sonos, Inc.* v. *D&M Holdings Inc. et al.*, Complaint for Patent Infringement, filed Oct. 21, 2014, 20 pages.
*Sonos, Inc.* v. *D&M Holdings Inc. et al.*, Declaration of Steven C. Visser, executed Sep. 9, 2016, 40 pages.
*Sonos, Inc.* v. *D&M Holdings Inc. et al.*, Defendant's Amended Invalidity Contentions, filed Sep. 14, 2016, 100 pages.
*Sonos, Inc.* v. *D&M Holdings Inc. et al.*, Defendant's Initial Invalidity Contentions Exhibit 11: Defendants' Invalidity Contentions for U.S. Pat. No. 9,219,959 filed Apr. 15, 2016, 172 pages.
*Sonos, Inc.* v. *D&M Holdings Inc. et al.*, Defendant's Initial Invalidity Contentions Exhibit 12: Defendants' Invalidity Contentions for U.S. Pat. No. D. 559,197 filed Apr. 15, 2016, 36 pages.
*Sonos, Inc.* v. *D&M Holdings Inc. et al.*, Defendant's Initial Invalidity Contentions Exhibit 2: Defendants' Invalidity Contentions for U.S. Pat. No. 8,588,949 filed Apr. 15, 2016, 112 pages.
*Sonos, Inc.* v. *D&M Holdings Inc. et al.*, Defendant's Initial Invalidity Contentions Exhibit 3: Defendants' Invalidity Contentions for U.S. Pat. No. 8,843,224 filed Apr. 15, 2016, 118 pages.
*Sonos, Inc.* v. *D&M Holdings Inc. et al.*, Defendant's Initial Invalidity Contentions Exhibit 4: Defendants' Invalidity Contentions for U.S. Pat. No. 8,938,312 filed Apr. 15, 2016, 217 pages.
*Sonos, Inc.* v. *D&M Holdings Inc. et al.*, Defendant's Initial Invalidity Contentions Exhibit 5: Defendants' Invalidity Contentions for U.S. Pat. No. 8,938,637 filed Apr. 15, 2016, 177 pages.
*Sonos, Inc.* v. *D&M Holdings Inc. et al.*, Defendant's Initial Invalidity Contentions Exhibit 6: Defendants' Invalidity Contentions for U.S. Pat. No. 9,042,556 filed Apr. 15, 2016, 86 pages.
*Sonos, Inc.* v. *D&M Holdings Inc. et al.*, Defendant's Initial Invalidity Contentions Exhibit 7: Defendants' Invalidity Contentions for U.S. Pat. No. 9,130,771 filed Apr. 15, 2016, 203 pages.
*Sonos, Inc.* v. *D&M Holdings Inc. et al.*, Defendant's Initial Invalidity Contentions Exhibit 8: Defendants' Invalidity Contentions for U.S. Pat. No. 9,195,258 filed Apr. 15, 2016, 400 pages.
*Sonos, Inc.* v. *D&M Holdings Inc. et al.*, Defendant's Initial Invalidity Contentions Exhibit 9: Defendants' Invalidity Contentions for U.S. Pat. No. 9,202,509 filed Apr. 15, 2016, 163 pages.
*Sonos, Inc.* v. *D&M Holdings Inc. et al.*, Defendant's Initial Invalidity Contentions, filed Apr. 15, 2016, 97 pages.
*Sonos, Inc.* v. *D&M Holdings Inc. et al.*, Defendant's Preliminary Identification of Indefinite Terms, provided Jul. 29, 2016, 8 pages.
*Sonos, Inc.* v. *D&M Holdings Inc. et al.*, Defendant's Preliminary Identification of Prior Art References, provided Jul. 29, 2016, 5 pages.
*Sonos, Inc.* v. *D&M Holdings Inc. et al.*, Defendants' Amended Answer, Defenses, and Counterclaims for Patent Infringement, filed Nov. 30, 2015, 47 pages.
*Sonos, Inc.* v. *D&M Holdings Inc. et al.*, Defendants' Answer to Plaintiff's Second Amended Complaint, filed Apr. 30, 2015, 19 pages.
*Sonos, Inc.* v. *D&M Holdings Inc. et al.*, Defendants' First Amended Answer to Plaintiffs' Third Amended Complaint, filed Sep. 7, 2016, 23 pages.
*Sonos, Inc.* v. *D&M Holdings Inc. et al.*, Defendants' Reply in Support of Partial Motion for Judgment on the Pleadings, filed Jun. 10, 2016, 15 pages.
*Sonos, Inc.* v. *D&M Holdings Inc. et al.*, Exhibit A: Defendants' Second Amended Answer to Plaintiffs' Third Amended Complaint, filed Sep. 9, 2016, 43 pages.
*Sonos, Inc.* v. *D&M Holdings Inc. et al.*, First Amended Complaint for Patent Infringement, filed Dec. 17, 2014, 26 pages.
*Sonos, Inc.* v. *D&M Holdings Inc. et al.*, Joint Claim Construction Chart, vol. 1 of 3 with Exhibits A-O, filed Aug. 17, 2016, 30 pages.
Advanced Driver Tab User Interface WaveLan GUI Guide, AVAGO0009, Agere Systems, Feb. 2004, 4 pages.
Agere Systems' Voice-over-Wireless LAN (VoWLAN) Station Quality of Service, AVAGO0015, Agere Systems, Jan. 2005, 5 pages.
Akyildiz et al., "Multimedia Group Synchronization Protocols for Integrated Services Networks," IEEE Journal on Selected Areas in Communications, 1996 pp. 162-173, vol. 14, No. 1.
Audio Authority: How to Install and Use the Model 1154 Signal Sensing Auto Selector, 2002, 4 pages.
Audio Authority: Model 1154B High Definition AV Auto Selector, 2008, 8 pages.
AudioSource: AMP 100 User Manual, 2003, 4 pages.
Automatic Profile Hunting Functional Description, AVAGO0013, Agere Systems, Feb. 2004, 2 pages.
AXIS Communication: AXIS P8221 Network I/O Audio Module, 2009, 41 pages.
Balfanz et al., "Network-in-a-Box: How to Set Up a Secure Wireless Network in Under a Minute", 13th USENIX Security Symposium—Technical Paper, 2002, 23 pages.
Balfanz et al., "Talking To Strangers: Authentication in Ad-Hoc Wireless Networks", Xerox Palo Alto Research Center, 2002, 13 pages.
Bogen Communications, Inc., ProMatrix Digitally Matrixed Amplifier Model PM3180, Copyright 1996, 2 pages.
Breebaart et al., "Multi-Channel Goes Mobile: MPEG Surround Binaural Rendering", AES 29th International Conference, 2006, Sep. 2-4, 1-13.
Change Notification: Agere Systems WaveLan Multimode Reference Design (D2 to D3), AVAGO0042, Agere Systems, Nov. 2004, 2 pages.
Deep-Sleep Implementation in WL60011 for IEEE 802.11b Applications, AVAGO0020, Agere Systems, Jul. 2004, 22 pages.
Denon AV Surround Receiver AVR-1604/684 User's Manual, 2004, 128 pages.
Denon AV Surround Receiver AVR-5800 Operating Instructions, Copyright 2000, 67 pages.
Faller, Christof, "Coding of Spatial Audio Compatible with Different Playback Formats", Audio Engineering Society Convention Paper (Presented at the 117th Convention), 2004, Oct. 28-31, 12 pages.
Fireball DVD and Music Manager DVDM-100 Installation and User's Guide, Copyright 2003, 185 pages.
Fireball MP-200 User's Manual, Copyright 2006, 93 pages.
Fireball Remote Control Guide WD006-1-1, Copyright 2003, 19 pages.
Fireball Se-D1 User's Manual, Copyright 2005, 90 pages.
Gaston et al., "Methods for Sharing Stereo and Multichannel Recordings Among Planetariums", Audio Engineering Society Convention Paper 7474, 2008, 15 pages.
Herre et al., "The Reference Model Architecture for MPEG Spatial Audio Coding", Audio Engineering Society Convention Paper (Presented at the 118th Convention), 2005, May 28-31, 13 pages.
IBM Home Director Installation and Service Manual, Copyright 1998, 124 pages.
IBM Home Director Owner's Manual, Copyright 1999, 67 pages.
Integra Audio Network Receiver NAC 2.3 Instruction Manual, 68 pages.
Integra Audio Network Server NAS 2.3 Instruction Manual, pp. 1-32.
Integra Service Manual, Audio Network Receiver Model NAC-2.3, Dec. 2002, 44 pages.
Issues with Mixed IEEE 802.b/802.11g Networks, Agere Systems, Feb. 2004, 5 pages.
Lake Processors: Lake® LM Series Digital Audio Processors Operation Manual, 2011, 71 pages.
"A/V System Controller, Owner's Manual," B&K Compontents, Ltd., 1998, 52 pages.
"Denon 2003-2004 Product Catalog," Denon, 2003-2004, 44 pages.

(56) References Cited

OTHER PUBLICATIONS

*Sonos, Inc.* v. *D&M Holdings Inc. et al.*, Opening Brief in Support of Defendants' Partial Motion for Judgment on the Pleadings for Lack of Patent-Eligible Subject Matter, filed May 6, 2016, 27 pages.
*Sonos, Inc.* v. *D&M Holdings Inc. et al.*, Plaintiff Sonos, Inc.'s Opening Claim Construction Brief, filed Sep. 9, 2016, 26 pages.
*Sonos, Inc.* v. *D&M Holdings Inc. et al.*, Plaintiff Sonos, Inc.'s Response in Opposition to Defendants' Partial Motion for Judgment on the Pleadings, filed May 27, 2016, 24 pages.
*Sonos, Inc.* v. *D&M Holdings Inc. et al.*, Second Amended Complaint for Patent Infringement, filed Feb. 27, 2015, 49 pages.
*Sonos, Inc.* v. *D&M Holdings Inc. et al.*, Third Amended Complaint for Patent Infringement, filed Jan. 29, 2016, 47 pages.
Sony: AIR-SA 50R Wireless Speaker, Copyright 2009, 2 pages.
Sony: Altus Quick Setup Guide ALT-SA32PC, Copyright 2009, 2 pages.
Sony: BD/DVD Home Theatre System Operating Instructions for BDV-E300, E301 and E801, Copyright 2009, 115 pages.
Sony: BD/DVD Home Theatre System Operating Instructions for BDV-IT1000/BDV-IS1000, Copyright 2008, 159 pages.
Sony: Blu-ray Disc/DVD Home Theatre System Operating Instructions for BDV-IZ1000W, Copyright 2010, 88 pages.
Sony: DVD Home Theatre System Operating Instructions for DAV-DZ380W/DZ680W/DZ880W, Copyright 2009, 136 pages.
Sony: DVD Home Theatre System Operating Instructions for DAV-DZ870W, Copyright 2008, 128 pages.
Sony Ericsson MS500 User Guide, Copyright 2009, 2 pages.
Sony: Home Theatre System Operating Instructions for HT-IS100, Copyright 2008, 168 pages.
Sony: HT-IS100, 5.1 Channel Audio System, last updated Nov. 2009, 2 pages.
Sony: Multi Channel AV Receiver Operating Instructions, 2007, 80 pages.
Sony: Multi Channel AV Receiver Operating Instructions for STR-DN1000, Copyright 2009, 136 pages.
Sony: STR-DN1000, Audio Video Receiver, last updated Aug. 2009, 2 pages.
Sony: Wireless Surround Kit Operating Instructions for WHAT-SA2, Copyright 2010, 56 pages.
TOA Corporation, Digital Processor DP-0206 DACsys2000 Version 2.00 Software Instruction Manual, Copyright 2001, 67 pages.
WaveLan High-Speed Multimode Chip Set, AVAGO0003, Agere Systems, Feb. 2003, 4 pages.
WaveLan High-Speed Multimode Chip Set, AVAGO0005, Agere Systems, Feb. 2003, 4 pages.
WaveLAN Wireless Integration Developer Kit (WI-DK) for Access Point Developers, AVAGO0054, Agere Systems, Jul. 2003, 2 pages.
WaveLAN Wireless Integration-Developer Kit (WI-DK) Hardware Control Function (HCF), AVAGO0052, Agere Systems, Jul. 2003, 2 pages.
WI-DK Release 2 WaveLan Embedded Drivers for VxWorks and Linux, AVAGO0056, Agere Systems, Jul. 2003, 2 pages.
WI-DK Release 2 WaveLan END Reference Driver for VxWorks, AVAGO0044, Agere Systems, Jul. 2003, 2 pages.
WI-DK Release 2 WaveLan LKM Reference Drivers for Linux, AVAGO0048, Agere Systems, Jul. 2003, 4 pages.
WPA Reauthentication Rates, AVAGO0063, Agere Systems, Feb. 2004, 3 pages.
Advisory Action dated Dec. 28, 2016, issued in connection with U.S. Appl. No. 13/705,176, filed Dec. 5, 2012, 4 pages.
Chinese Office Action, Office Action dated Dec. 20, 2016, issued in connection with Chinese Application No. 201380044446.8, 16 pages.
Dhir, Amit, "Wireless Home Networks—DECT, Bluetooth, Home RF, and Wirelss LANs," XILINX, wp135 (v1.0), Mar. 21, 2001, 18 pages.
European Patent Office, Examination Report dated Oct. 24, 2016, issued in connection with European Patent Application No. 13808623.6, 4 pages.

European Patent Office, Office Action dated Nov. 25, 2016, issued in connection with EP Application No. 13810340.3, 5 pages.
Final Office Action dated Jan. 12, 2017, issued in connection with U.S. Appl. No. 14/504,812, filed Oct. 2, 2014, 25 pages.
Final Office Action dated Dec. 13, 2016, issued in connection with U.S. Appl. No. 13/871,795, filed Apr. 26, 2013, 41 pages.
Final Office Action dated Oct. 19, 2016, issued in connection with U.S. Appl. No. 13/848,921, filed Mar. 22, 2013, 14 pages.
Fout, Tom, "Universal Plug and Play (UPnP) Client Support," Microsoft, Aug. 2001, 18 pages.
Japanese Patent Office, Final Office Action dated Nov. 8, 2016, issued in connection with Japanese Patent Application No. 2015-520286, 5 pages.
Japanese Patent Office, Office Action dated Nov. 22, 2016, issued in connection with Japanese Application No. 2015-520288, 6 pages.
Japanese Patent Office, Office Action dated Nov. 29, 2016, issued in connection with Japanese Application No. 2015-516169, 4 pages.
Kou et al., "RenderingControl:1 Service Template Verion 1.01," Contributing Members of the UPnP Forum, Jun. 25, 2002, 63 pages.
"Linux SDK for UPnP Devices vI.2," Intel Corporation, Jan. 17, 2003, 102 pages.
Non-Final Office Action dated Jan. 3, 2017, issued in connection with U.S. Appl. No. 14/808,875, filed Jul. 24, 2015, 10 pages.
Non-Final Office Action dated Nov. 3, 2016, issued in connection with U.S. Appl. No. 14/184,528, filed Feb. 19, 2014, 17 pages.
Non-Final Office Action dated Oct. 4, 2016, issued in connection with U.S. Appl. No. 15/089,758, filed Apr. 4, 2016, 9 pages.
Non-Final Office Action dated Oct. 5, 2016, issued in connection with U.S. Appl. No. 13/864,250, filed Apr. 17, 2013, 10 pages.
Non-Final Office Action dated Oct. 5, 2016, issued in connection with U.S. Appl. No. 13/864,252, filed Apr. 17, 2013, 11 pages.
Non-Final Office Action dated Oct. 6, 2016, issued in connection with U.S. Appl. No. 15/088,678, filed Apr. 1, 2016, 9 pages.
Non-Final Office Action dated Oct. 7, 2016, issued in connection with U.S. Appl. No. 15/156,392, filed May 17, 2016, 8 pages.
Non-Final Office Action dated Nov. 10, 2016, issued in connection with U.S. Appl. No. 15/243,355, filed Aug. 22, 2016, 11 pages.
Non-Final Office Action dated Jan. 12, 2017, issued in connection with U.S. Appl. No. 13/895,076, filed May 15, 2013, 10 pages.
Non-Final Office Action dated Nov. 16, 2016, issued in connection with U.S. Appl. No. 15/228,639, filed Aug. 4, 2016, 15 pages.
Non-Final Office Action dated Sep. 21, 2016, issued in connection with U.S. Appl. No. 15/080,591, filed Mar. 25, 2016, 9 pages.
Non-Final Office Action dated Sep. 21, 2016, issued in connection with U.S. Appl. No. 15/080,716, filed Mar. 25, 2016, 8 pages.
Non-Final Office Action dated Sep. 21, 2016, issued in connection with U.S. Appl. No. 15/088,283, filed Apr. 1, 2016, 8 pages.
Non-Final Office Action dated Sep. 21, 2016, issued in connection with U.S. Appl. No. 15/088,532, filed Apr. 1, 2016, 9 pages.
Non-Final Office Action dated Sep. 22, 2016, issued in connection with U.S. Appl. No. 15/088,906, filed Apr. 1, 2016, 9 pages.
Non-Final Office Action dated Sep. 22, 2016, issued in connection with U.S. Appl. No. 15/155,149, filed May 16, 2016, 7 pages.
Non-Final Office Action dated Nov. 29, 2016, issued in connection with U.S. Appl. No. 13/894,179, filed May 14, 2013, 14 pages.
Non-Final Office Action dated Nov. 30, 2016, issued in connection with U.S. Appl. No. 15/243,186, filed Aug. 22, 2016, 12 pages.
Non-Final Office Action dated Sep. 30, 2016, issued in connection with U.S. Appl. No. 13/864,249, filed Apr. 17, 2013, 12 pages.
Notice of Allowance dated Dec. 1, 2016, issued in connection with U.S. Appl. No. 15/088,283, filed Apr. 1, 2016, 9 pages.
Notice of Allowance dated Dec. 2, 2016, issued in connection with U.S. Appl. No. 15/088,532, filed Apr. 1, 2016, 9 pages.
Notice of Allowance dated Dec. 2, 2016, issued in connection with U.S. Appl. No. 15/088,678, filed Apr. 1, 2016, 9 pages.
Notice of Allowance dated Dec. 2, 2016, issued in connection with U.S. Appl. No. 15/089,758, filed Apr. 4, 2016, 9 pages.
Notice of Allowance dated Dec. 2, 2016, issued in connection with U.S. Appl. No. 15/155,149, filed May 16, 2016, 9 pages.
Notice of Allowance dated Dec. 7, 2016, issued in connnection with U.S. Appl. No. 15/156,392, filed May 17, 2016, 9 pages.
Notice of Allowance dated Dec. 13, 2016, issued in connection with U.S. Appl. No. 15/080,591, filed Mar. 25, 2016, 9 pages.

(56) References Cited

OTHER PUBLICATIONS

Notice of Allowance dated Dec. 14, 2016, issued in connection with U.S. Appl. No. 15/088,906, filed Apr. 1, 2016, 9 pages.
Notice of Allowance dated Dec. 22, 2016, issued in connection with U.S. Appl. No. 15/080,716, filed Mar. 25, 2016, 9 pages.
Pascoe, Bob, "Salutation Architectures and the newly defined service discovery protocols from Microsoft® and Sun®," Salutation Consortium, White Paper, Jun. 6, 1999, 5 pages.
Ritchie et al., "MediaServer:1 Device Template Version 1.01," Contributing Members of the UPnP Forum, Jun. 25, 2002, 12 pages.
Ritchie et al., "UPnP AV Architecture:1, Version 1.0," Contributing Members of the UPnP Forum, Jun. 25, 2002, 22 pages.
Ritchie, John, "MediaRenderer:1 Device Template Version 1.01," Contributing Members of the UPnP Forum, Jun. 25, 2002, 12 pages.
Schulzrinne et al., "RTP: A Transport Protocol for Real-Time Applications," Network Working Group, Jan. 1996, pp. 1-75.
U.S. Appl. No. 60/490,768, filed Jul. 28, 2003, entitled "Method for synchronizing audio playback between multiple networked devices," 13 pages.
U.S. Appl. No. 60/825,407, filed Sep. 12, 2003, entitled "Controlling and manipulating groupings in a multi-zone music or media system," 82 pages.
"UPnP and Sonos Questions," Sonos Community, Dec. 2006, 5 pages.
Yamaha DME 64 Owner's Manual; copyright 2004, 80 pages.
Yamaha DME Designer 3.5 setup manual guide; copyright 2004, 16 pages.
Yamaha DME Designer 3.5 User Manual; Copyright 2004, 507 pages.
Advisory Action dated Mar. 8, 2017, issued in connection with U.S. Appl. No. 13/871,795, filed Apr. 26, 2013, 22 pages.
AVTransport:1 Service Template Version 1.01 For UPnP, Version 1.0 (Jun. 25, 2002) (66 pages).
Chinese Patent Office, Second Office Action dated Feb. 27, 2017, issued in connection with Chinese Patent Application No. 201380044380.2, 22 pages.
Connection Manager: 1 Service Template Version 1.01 For UPnP, Version 1.0 (Jun. 25, 2002) (25 pages).
ContentDirectory:1 Service Template Version 1.01 For UPnP, Version 1.0 (Jun. 25, 2002) (89 pages).
Designing a UPnP AV MediaServer, Nelson Kidd (2003) (55 pages).
General Event Notification Architecture Base: Client to Arbiter (Apr. 2000) (23 pages).
Home Networking with Universal Plug and Play, IEEE Communications Magazine, vol. 39 No. 12 (Dec. 2001) (16 pages).
*Implicit, LLC* v. *Sonos, Inc.*, Defendant's Original Complaint (Mar. 3, 2017) (15 pages).
Intel Designing a UPnP AV Media Renderer, v. 1.0 ("Intel AV Media Renderer") (May 20, 2003) (46 pages).
Intel Media Renderer Device Interface ("Intel Media Renderer") (Sep. 6, 2002) (62 pages).
Intel SDK for UPnP Devices Programming Guide, Version 1.2.1, (Nov. 2002) (30 pages).
Linux SDK for UPnP Devices v. 1.2 (Sep. 6, 2002) (101 pages).
MediaRenderer:1 Device Template Version 1.01 For UPnP, Version 1.0 (Jun. 25, 2002) (12 pages).
MediaServer:1 Device Template Version 1.01 For UPnP, Version 1.0 (Jun. 25, 2002) (12 pages).
Microsoft, Universal Plug and Play (UPnP) Client Support ("Microsoft UPnP") (Aug. 2001) (18 pages).
Microsoft Window's XP Reviewer's Guide (Aug. 2001) (61 pages).
Network Time Protocol (NTP), RFC 1305 (Mar. 1992) (120 pages).
Notice of Allowance dated Mar. 9, 2017, issued in connection with U.S. Appl. No. 15/080,591, filed Mar. 25, 2016, 7 pages.
Notice of Allowance dated Mar. 15, 2017, issued in connection with U.S. Appl. No. 15/080,716, filed Mar. 25, 2016, 7 pages.
Real Time Control Protocol (RTCP) and Realtime Transfer Protocol (RTP), RFC 1889 (Jan. 1996) (75 pages).
Realtime Streaming Protocol (RTSP), RFC 2326 (Apr. 1998) (92 pages).
Realtime Transport Protocol (RTP), RFC 3550 (Jul. 2003) (89 pages).
RenderingControl:1 Service Template Version 1.01 For UPnP, Version 1.0, (Jun. 25, 2002) (63 pages).
Rothermel et al., "Clock Hierarchies—An Abstraction for Grouping and Controlling Media Streams," University of Stuttgart Institute of Parallel and Distributed High-Performance Systems, Jan. 1996, 23 pages.
Rothermel, Kurt, "State-of-the-Art and Future Research in Stream Synchronization," University of Stuttgart, 3 pages.
Simple Network Time Protocol (SNTPI), RFC 1361 (Aug. 1992) (10 pages).
Simple Network Time Protocol (SNTPII), RFC 1769 (Mar. 1995) (14 pages).
Simple Service Discovery Protocol/1.0 Operating without an Arbiter (Oct. 28, 1999) (24 pages).
*Sonos, Inc.* v *D&M Holdings*, D&M Supp Opposition Brief including Exhibits, Mar. 17, 2017, 23 pages.
*Sonos, Inc.* v. *D&M Holdings*, Expert Report of Jay P. Kesan including Appendices A-P, Feb. 20, 2017, 776 pages.
*Sonos, Inc.* v. *D&M Holdings Inc. et al.*, Exhibit A: Defendants' First Amended Answer to Plaintiffs' Third Amended Complaint, provided Aug. 1, 2016, 26 pages.
*Sonos, Inc.* v. *D&M Holdings Inc. et al.*, Exhibit A: Defendants' Second Amended Answer to Plaintiffs' Third Amended Complaint, provided Sep. 9, 2016, 88 pages.
*Sonos, Inc.* v. *D&M Holdings Inc. et al.*, Sonos's Motion to Strike Defendants' New Amended Answer Submitted with their Reply Brief, provided Sep. 15, 2016, 10 pages.
*Sonos, Inc.* v. *D&M Holdings Inc. et al.*, Sonos's Opposition to Defendants' Motion for Leave to Amend their Answer to Add the Defense of Inequitable Conduct, provided Oct. 31, 2016, 26 pages.
*Sonos, Inc.* v. *D&M Holdings Inc. et al.*, Defendants' Final Invalidity Contentions (Jan. 18, 2017) (106 pages).
*Sonos, Inc.* v. *D&M Holdings Inc. et al.*, DI 226, Opinion Denying Inequitable Conduct Defenses, Feb. 6, 2017, updated, 5 pages.
*Sonos, Inc.* v. *D&M Holdings Inc. et al.*, DI 242, US District Judge Andrews 101 Opinion, Mar. 13, 2017, 16 pages.
*Sonos, Inc.* v *D&M Holdings*, Sonos Supp Opening Markman Brief including Exhibits, Mar. 3, 2017, 17 pages.
*Sonos, Inc.* v. *D&M Holdings*, Sonos Supp Reply Markman Brief including Exhibits, Mar. 29, 2017, 36 pages.
*Sonos, Inc.* v. *D&M Holdings Inc. et al.*, Defendant's Amended Invalidity Contentions Exhibit 1: Defendants' Invalidity Contentions for U.S. Pat. No. 7,571,014 filed Sep. 16, 2016, 270 pages.
*Sonos, Inc.* v. *D&M Holdings Inc. et al.*, Defendant's Amended Invalidity Contentions Exhibit 10: Defendants' Invalidity Contentions for U.S. Pat. No. 9,219,959 filed Sep. 27, 2016, 236 pages.
*Sonos, Inc.* v. *D&M Holdings Inc. et al.*, Defendant's Amended Invalidity Contentions Exhibit 11: Defendants' Invalidity Contentions for U.S. Pat. No. D. 559,197 filed Sep. 27, 2016, 52 pages.
*Sonos, Inc.* v. *D&M Holdings Inc. et al.*, Defendant's Amended Invalidity Contentions Exhibit 2: Defendants' Invalidity Contentions for U.S. Pat. No. 8,588,949 filed Sep. 27, 2016, 224 pages.
*Sonos, Inc.* v. *D&M Holdings Inc. et al.*, Defendant's Amended Invalidity Contentions Exhibit 3: Defendants' Invalidity Contentions for U.S. Pat. No. 8,843,224 filed Sep. 27, 2016, 147 pages.
*Sonos, Inc.* v. *D&M Holdings Inc. et al.*, Defendant's Amended Invalidity Contentions Exhibit 4: Defendants' Invalidity Contentions for U.S. Pat. No. 8,938,312 filed Sep. 27, 2016, 229 pages.
*Sonos, Inc.* v. *D&M Holdings Inc. et al.*, Defendant's Amended Invalidity Contentions Exhibit 5: Defendants' Invalidity Contentions for U.S. Pat. No. 8,938,637 filed Sep. 27, 2016, 213 pages.
*Sonos, Inc.* v. *D&M Holdings Inc. et al.*, Defendant's Amended Invalidity Contentions Exhibit 6: Defendants' Invalidity Contentions for U.S. Pat. No. 9,042,556 filed Sep. 27, 2016, 162 pages.
*Sonos, Inc.* v. *D&M Holdings Inc. et al.*, Defendant's Amended Invalidity Contentions Exhibit 7: Defendants' Invalidity Contentions for U.S. Pat. No. 9,195,258 filed Sep. 27, 2016, 418 pages.
*Sonos, Inc.* v. *D&M Holdings Inc. et al.*, Defendant's Amended Invalidity Contentions Exhibit 8: Defendants' Invalidity Contentions for U.S. Pat. No. 9,202,509 filed Sep. 27, 2016, 331 pages.

(56) References Cited

OTHER PUBLICATIONS

*Sonos, Inc.* v. *D&M Holdings Inc. et al.*, Defendant's Amended Invalidity Contentions Exhibit 9: Defendants' Invalidity Contentions for U.S. Pat. No. 9,213,357 filed Sep. 27, 2016, 251 pages.
*Sonos, Inc.* v. *D&M Holdings Inc. et al.*, Defendants' Brief in Support of their Motion for Leave to Amend their Answer to Add the Defense of Inequitable Conduct, provided Oct. 12, 2016, 24 pages.
*Sonos, Inc.* v. *D&M Holdings Inc. et al.*, Defendants' Opposition to Sonos's Motion to Strike Defendants' New Amended Answer Submitted with their Reply, provided Oct. 3, 2016, 15 pages.
*Sonos, Inc.* v. *D&M Holdings Inc. et al.*, Exhibit A: Defendants' Second Amended Answer to Plaintiffs' Third Amended Complaint, provided Oct. 12, 2016, 43 pages.
*Sonos, Inc.* v. *D&M Holdings Inc. et al.*, Exhibit B: Defendants' Second Amended Answer to Plaintiffs' Third Amended Complaint, provided Oct. 12, 2016, 43 pages.
*Sonos, Inc.* v. *D&M Holdings Inc. et al.*, Opening Brief in Support of Defendants' Motion for Leave to Amend Their Answer to Add the Defense of Inequitable Conduct, provided Aug. 1, 2016, 11 pages.
*Sonos, Inc.* v. *D&M Holdings Inc. et al.*, Order, provided Oct. 7, 2016, 2 pages.
*Sonos, Inc.* v. *D&M Holdings Inc. et al.*, Plaintiffs Opposition to Defendants' Motion for Leave to Amend Their Answer to Add the Defense of Inequitable Conduct, provided Aug. 26, 2016, 25 pages.
*Sonos, Inc.* v. *D&M Holdings Inc. et al.*, Redlined Exhibit B: Defendants' First Amended Answer to Plaintiffs' Third Amended Complaint, provided Aug. 1, 2016, 27 pages.
*Sonos, Inc.* v. *D&M Holdings Inc. et al.*, Reply Brief in Support of Defendants' Motion for Leave to Amend their Answer to Add the Defense of Inequitable Conduct, provided Nov. 10, 2016, 16 pages.
*Sonos, Inc.* v. *D&M Holdings Inc. et al.*, Reply Brief in Support of Defendants' Motion for Leave to Amend their Answer to Add the Defense of Inequitable Conduct, provided Sep. 9, 2016, 16 pages.
*Sonos, Inc.* v. *D&M Holdings*, DI 206-1, Transcript of 101 Hearing (Nov. 28, 2016) (28 pages).
*Sonos, Inc.* v. *D&M Holdings*, DI 207, PUBLIC Joint Claim Construction Brief (Nov. 30, 2016) (88 pages).
*Sonos, Inc.* v. *D&M Holdings*, DI 214, D&M Post-Markman Letter (Dec. 22, 2016) (13 pages).
*Sonos, Inc.* v. *D&M Holdings*, DI 215, Sonos Post-Markman Letter (Dec. 22, 2016) (15 pages).
*Sonos, Inc.* v. *D&M Holdings*, DI 219, Claim Construction Opinion (Jan. 12, 2017) (24 pages).
*Sonos, Inc.* v. *D&M Holdings*, DI 221, Claim Construction Order (Jan. 18, 2017) (2 pages).
*Sonos, Inc.* v. *D&M Holdings*, Markman Hearing Transcript (Dec. 14, 2016) (69 pages).
Understanding Universal Plug and Play, Microsoft White Paper (Jun. 2000) (45 pages).
Universal Plug and Play Device Architecture V. 1.0, (Jun. 8, 2000) (54 pages).
Universal Plug and Play in Windows XP, Tom Fout. Microsoft Corporation (Jul. 2001) (33 pages).
Universal Plug and Play ("UPnP") AV Architecture:1 For UPnP, Version 1.0, (Jun. 25, 2002) (22 pages).
Universal Plug and Play Vendor's Implementation Guide (Jan. 5, 2000) (7 pages).
UPnP AV Architecture:0.83 (Jun. 12, 2002) (22 pages).
UPnP Design by Example, A Software Developers Guide to Universal Plug and Play Michael Jeronimo and JackWeast, Intel Press (Apr. 2003) (511 pages).
WANCommonInterfaceConfig:1 Service Template Version 1.01 for UPnP, Ver. 1.0 (Nov. 12, 2001) (24 pages).
WANIPConnection:1 Service Template Version 1.01 For UPnP Ver. 1.0 (Nov. 12, 2001) (74 pages).
WANPPPConnection:1 Service Template Version 1.01 for UPnP, Version 1.0 (Nov. 12, 2001) (89 pages).
Windows Media Connect Device Compatibility Specification (Apr. 12, 2004) (16 pages).
Final Office Action dated Jun. 2, 2017, issued in connection with U.S. Appl. No. 13/848,932, filed Mar. 22, 2013, 32 pages.
Final Office Action dated Apr. 10, 2017, issued in connection with U.S. Appl. No. 15/243,355, filed Aug. 22, 2016, 15 pages.
Final Office Action dated May 15, 2017, issued in connection with U.S. Appl. No. 13/864,252, filed Apr. 17, 2013, 13 pages.
Final Office Action dated May 16, 2017, issued in connection with U.S. Appl. No. 13/864,249, filed Apr. 17, 2013, 14 pages.
Final Office Action dated May 16, 2017, issued in connection with U.S. Appl. No. 13/864,250, filed Apr. 17, 2013, 12 pages.
Final Office Action dated Apr. 20, 2017, issued in connection with U.S. Appl. No. 13/864,248, filed Apr. 17, 2013, 14 pages.
Fries et al. "The MP3 and Internet Audio Handbook: Your Guide to the Digital Music Revolution." 2000, 320 pages.
"Microsoft Windows XP File and Printer Share with Microsoft Windows" Microsoft Windows XP Technical Article, 2003, 65 pages.
"SMPTE Made Simple: A Time Code Tutor by Timeline," 1996, 46 pages.
Niederst, Jennifer "O'Reilly Web Design in a Nutshell," Second Edition, Sep. 2001, 678 pages.
Non-Final Office Action dated Apr. 10, 2017, issued in connection with U.S. Appl. No. 13/871,785, filed Apr. 26, 2013, 10 pages.
Non-Final Office Action dated Apr. 20, 2017, issued in connection with U.S. Appl. No. 90/013,882, filed Dec. 27, 2016, 197 pages.
Notice of Allowance dated Jun. 1, 2017, issued in connection with U.S. Appl. No. 14/290,493, filed May 29, 2014, 12 pages.
Notice of Allowance dated Apr. 25, 2017, issued in connection with U.S. Appl. No. 15/156,392, filed May 17, 2016, 8 pages.
Notice of Allowance dated Mar. 27, 2017, issued in connection with U.S. Appl. No. 15/089,758, filed Apr. 4, 2016, 7 pages.
Notice of Allowance dated Mar. 28, 2017, issued in connection with U.S. Appl. No. 15/088,906, filed Apr. 1, 2016, 7 pages.
Notice of Allowance dated Mar. 28, 2017, issued in connection with U.S. Appl. No. 15/155,149, filed May 16, 2016, 7 pages.
Notice of Allowance dated Apr. 3, 2017, issued in connection with U.S. Appl. No. 15/088,678, filed Apr. 1, 2016, 8 pages.
Notice of Allowance dated Mar. 30, 2017, issued in connection with U.S. Appl. No. 15/088,532, filed Apr. 1, 2016, 7 pages.
Notice of Allowance dated Apr. 6, 2017, issued in connection with U.S. Appl. No. 15/088,283, filed Apr. 1, 2016, 7 pages.
Notice of Incomplete Re-Exam Request dated May 25, 2017, issued in connection with U.S. Appl. No. 30/013,959 , filed Apr. 1, 2016, 10 pages.
Pre-Brief Conference Decision dated May 11, 2017, issued in connection with U.S. Appl. No. 14/504,812, filed Oct. 2, 2014, 2 pages.
Request for Ex Parte Reexamination submitted in U.S. Pat. No. 9,213,357 dated May 22, 2017, 85 pages.
"Symantec pcAnywhere User's Guide," v 10.5.1, 1995-2002, 154 pages.
Advisory Action dated Jun. 20, 2017, issued in connection with U.S. Appl. No. 15/243,355, filed Aug. 22, 2016, 5 pages.
Final Office Action dated Jun. 15, 2017, issued in connection with U.S. Appl. No. 15/228,639, filed Aug. 4, 2016, 16 pages.
First Action Pre-Interview Office Action dated Jun. 22, 2017, issued in connection with U.S. Appl. No. 14/516,883, filed Oct. 17, 2014, 5 pages.
Renewed Request for Ex Parte Re-Examination, U.S. Appl. No. 90/013,959, filed Jun. 16, 2017, 126 pages.

* cited by examiner

SYSTEMS AND METHODS FOR SYNCHRONIZING OPERATIONS AMONG A PLURALITY OF INDEPENDENTLY CLOCKED DIGITAL DATA PROCESSING DEVICES THAT INDEPENDENTLY SOURCE DIGITAL DATA

CROSS-REFERENCE TO RELATED APPLICATIONS

The present application claims the benefit of and priority to U.S. patent application Ser. No. 13/827,653, filed Mar. 14, 2013, for "Systems and Methods for Synchronizing Operations Among a Plurality of Independently Clocked Digital Data Processing Devices that Independently Source Digital Data"; U.S. patent application Ser. No. 13/298,090, filed Nov. 16, 2011, for "Systems and Methods for Synchronizing Operations Among a Plurality of Independently Clocked Digital Data Processing Devices that Independently Source Digital Data"; U.S. patent application Ser. No. 11/906,702, filed on Oct. 2, 2007, for "Systems and Methods for Synchronizing Operations Among a Plurality of Independently Clocked Digital Data Processing Devices that Independently Source Digital Data"; U.S. Provisional Patent Application Ser. No. 60/860,964, filed on Nov. 22, 2006, for "Systems and Methods for Synchronizing Operations Among a Plurality of Independently Clocked Digital Data Processing Devices that Independently Source Digital Data"; and U.S. Provisional Patent Application Ser. No. 60/876,455, filed on Dec. 20, 2006, for "Systems and Methods for Synchronizing Operations Among a Plurality of Independently Clocked Digital Data Processing Devices that Independently Source Digital Data," each of which is incorporated herein by reference. The present application also incorporates by reference U.S. patent application Ser. No. 11/801,468, filed on May 9, 2007, for "Systems and Methods for Synchronizing Operations Among a Plurality of Independently Clocked Digital Data Processing Devices Without a Voltage Controlled Crystal Oscillator," which is a continuation-in-part claiming the benefit and priority of U.S. patent application Ser. No. 10/816,217, filed on Apr. 1, 2004, for "System and Method For Synchronizing Operations Among a Plurality of Independently Clocked Digital Data Processing Devices," which claims the benefit and priority of U.S. Provisional Patent Application Ser. No. 60/490,768, filed on Jul. 28, 2003, for "Method For Synchronizing Audio Playback Between Multiple Networked Devices," both of which are also incorporated herein by reference, and U.S. patent application Ser. No. 11/113,363 filed on Apr. 23, 2005 for "System and Method for Synchronizing Channel Handoff As Among a Plurality of Devices."

FIELD OF THE INVENTION

The present invention relates generally to digital content, and more particularly to systems and methods for synchronizing operations among a plurality of independently clocked digital data processing devices that independently source digital data.

DESCRIPTION OF RELATED ART

Synchronization of digital data among a plurality of independently clocked digital data processing devices (i.e. at least one distribution device and at least one execution device) in a synchrony group may be performed when a single distribution device provides the same digital data and timing information to some or all of the execution devices in the synchrony group. In certain situations, however, a single distribution device may only send the same timing information without the corresponding digital data to some or all of the execution devices in the synchrony group. Accordingly, each execution device is posed with the problem of needing to source the digital data from an alternative source and needing to execute the digital data at or near the same time as other execution devices in the group are executing the same digital data (i.e., in synchrony). There is therefore a need for systems and methods for synchronizing operations among a plurality of independently clocked digital data processing devices that independently source digital data.

SUMMARY OF THE INVENTION

Exemplary systems according to the present invention include a distribution device configured to distribute timestamp, offset and source location information for a digital data stream to an execution device. The execution device is configured to seek digital data corresponding to the received information, and to retrieve and execute the digital data relative to a clock rate maintained by the distribution device, as facilitated by the timestamp information. Exemplary methods include receiving timestamp, offset and source location information for the digital data stream in an execution device and seeking digital data corresponding to the received offset and source location information.

DETAILED DESCRIPTION

Exemplary systems and methods provide synchronization of digital data among a plurality of independently clocked digital data processing devices. In general, independently clocked digital data processing devices may include a distribution device and one or more execution devices. In some situations, the distribution device may distribute the same timing information and digital data to one or more execution devices (or the distribution device may distribute copies of the same timing information and digital data). The execution devices each execute the digital data per the timing information, resulting in each execution device playing the same digital data at or near the same time (i.e., in synchrony as a synchrony group). In other situations, the distribution device may distribute the same timing information to one or more execution devices without the corresponding digital data. Such situations may arise in the case of systems operating with digital rights management software such as WINDOWS MEDIA DIGITAL RIGHTS MANAGEMENT™ ("WMDRM") software or similar systems with forwarding restrictions that limit or prevent a distribution device from copying and/or distributing digital data to execution devices. The exemplary systems and methods provided herein allow each execution device to independently source or seek digital data corresponding to timestamp, offset, and source location information provided by the distribution device to result in each execution device executing the same or nearly the same digital data at or near the same time in a synchrony.

Figure 1:
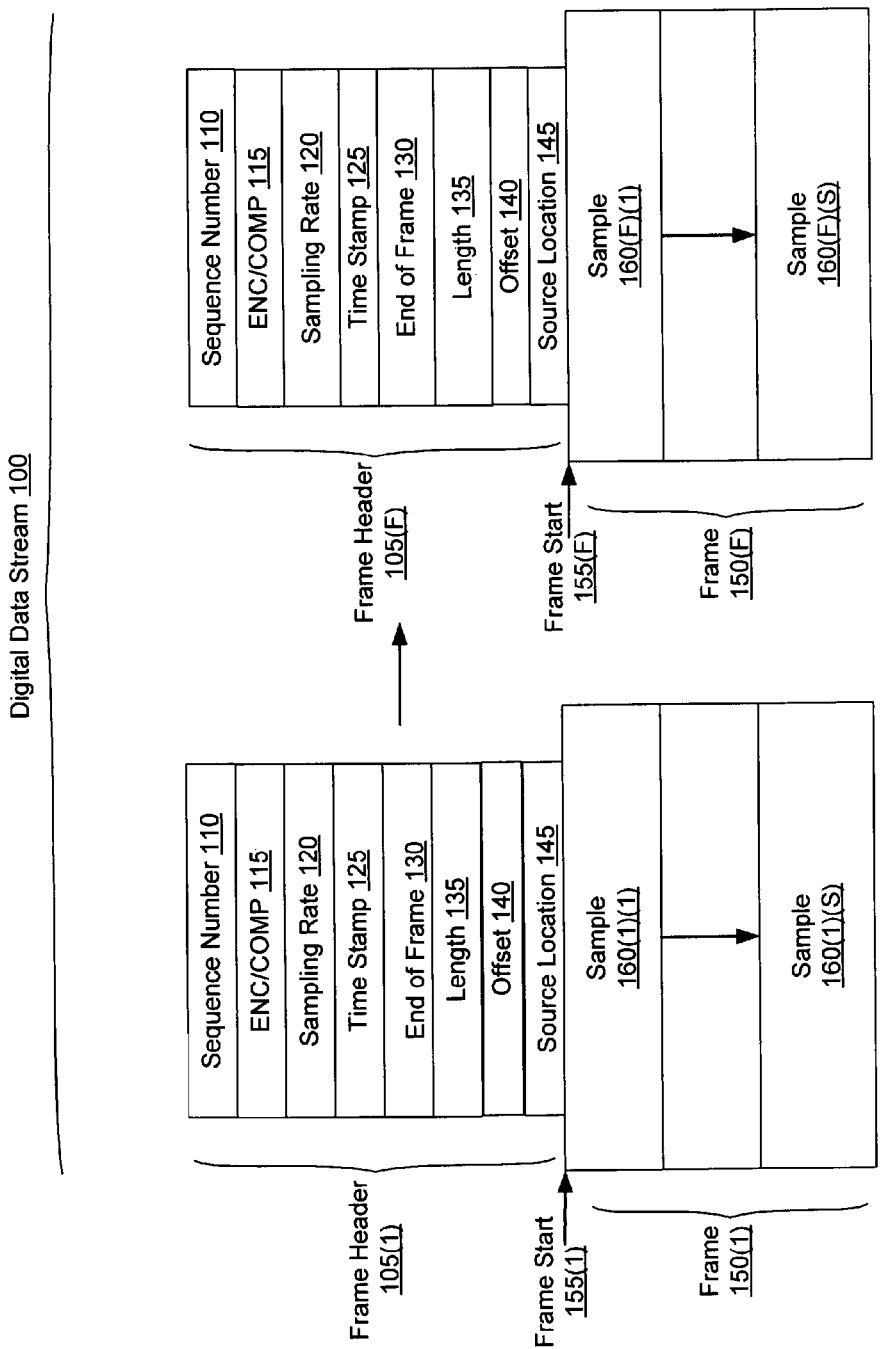
FIG. 1 schematically depicts an illustrative framing that may be added to digital data according to one exemplary system and method for synchronization of digital data among a plurality of independently clocked digital data processing devices.

FIG. 1 depicts illustrative framing data according to one exemplary system and method for synchronization of a digital data stream among a plurality of independently clocked digital data processing devices. Depicted in FIG. 1 is a digital data stream 100, which includes a sequence of frames 150(1) through 150(F) (generally identified herein by reference numeral 150(f) (not shown—instead frames 150(1) through 150(F) are shown)). Each frame 150(f) has a frame start 155(f) (not shown—instead frame start 155(1) through 155(F) are shown), as shown by frame start 155(1) with respect to exemplary frame 150(1) and as shown by frame start 155(F) with respect to exemplary frame 150(F). Each frame 150(f) includes a series of audio, visual, audio-visual and/or other digital samples as illustrated by the series of samples 160(1)(1) through 160(F)(S) (generally identified herein by reference numeral 160(f)(s) (not shown—instead samples 160(1)(1) through 160(F)(S) are shown)) with respect to frame 150(1). The number of samples 160(f)(s) may differ in each frame 150(f), or the number of samples may be the same for some or all of the frames in digital data stream 100. According to some embodiments, the frames and corresponding samples ("digital data") may be received by a distribution device from a source of digital data, such as the Internet.

The illustrative framing strategy shown in FIG. 1 includes a frame header 105(f) associated with each frame 150(f), as exemplified by frame header 105(1) with respect to frame 150(1). According to various embodiments, the distribution device may add the frame header 105(f) to the received digital data and copy and/or distribute some or all of the information in the frame header, without the corresponding digital data. According to further embodiments, the distribution device may also copy and/or distribute an empty or unusable file that previously contained the digital data. Each frame header 105(f) has a number of fields for storing various types of information. For example, the header 105(1) associated with frame 150(1) includes a sequence number field 110, an encoding type field 115, a sampling rate field 120, a time stamp field 125, an end of frame field 130, a length field 135, an offset field 140, and a source location field 145. Further, each frame header may include a packet ID number, and a small 4 bit number called an encryption parameter, set ID, or a similar term. The information in the various fields within the frame header may be copied and/or distributed by the distribution device at the same time or at different times. For example, the information in the source location field 145 may be copied and distributed by the distribution device before the distribution device copies and distributes the corresponding information in the offset field 140. Other variations of the order of distributing data may be employed and remain within the scope of the exemplary systems and methods contemplated herein.

Generally, the sequence number field 110 receives a sequence number "f" that identifies the relative position of the frame 150(f) in the sequence of frames comprising the digital data stream 100. For example, with respect to sequence number field 110 as shown in the exemplary frame header 105(1), the received sequence number is "1." The encoding type field 115 receives a value that identifies the type of encoding and/or compression that has been used in generating the digital data stream. Conventional encoding or compression schemes include, for example, MP3 and WAV encoding and/or other compression schemes, although it will be appreciated that other schemes may be provided for as well. The sampling rate field 120 receives sampling rate information that may indicate the sampling rate relative to an independently clocked distribution device and/or relative to an independently clocked execution device.

The time stamp field 125, according to some embodiments, stores a time stamp identifying a time at which an independently clocked execution device may execute a particular frame (or execute an independently sourced copy of a particular frame) and store it as the time stamp in time stamp field 125. A time stamp may be generated for each frame 150(f) of a particular digital data stream, a time stamp may be generated for only a first frame 150(1) of a particular digital data stream, or a time stamp may be generated for some other variation of frames associated with a digital data stream. In further systems and methods, the time stamp may be generated for each frame 150(f) of a particular digital data stream, however, only various selected time stamps may be copied and/or distributed by the distribution device to the execution devices in the synchrony group.

According to one embodiment, a time stamp is generated, copied and distributed for each frame 150(f) of a digital data stream 100 in order to allow multiple execution devices to execute a sequence of frames in synchrony, even when one of the execution devices fails to seek and/or retrieve one or more frames due to a power loss or other interruption. In other words, because a time stamp is associated with each frame, an execution device may be able to determine which frame to execute at a particular time in the event of an interruption, rather than just resuming by executing each subsequent frame in sequence without respect to a common time element. In an alternative embodiment, the execution device may execute one or more frames per a time stamp and execute each subsequent frame in a sequence without respect to a time stamp.

In one embodiment, the condition of the end of frame field 130 indicates whether a particular frame 150(f) contains the last samples for the digital data stream 100. If the frame 150(f) does not contain the samples associated with the end of the digital data stream 100, the end of frame field 130 may be clear. On the other hand, if the frame 150(f) such as exemplary frame 150(F) contains the samples associated with the end of the digital data stream 100, the end of frame field 130 may be set. Additionally, the length field 135 may contain a value that identifies the number of samples in the last frame 150(F) of the digital data stream 100.

According to one embodiment, offset information stored in the offset field 140 may specify a random-access offset corresponding to a particular frame start 155(f). A second frame 150(2) may follow the exemplary first frame 150(1) in the progression or sequence of frames ending with frame 150(F). The information in the offset field 140 that is associated with the second frame 150(2) may be copied and distributed by a distribution device to an execution device. The execution device receiving the information in the offset field 140 associated with the second frame 150(2) may use the offset information to seek frame start 155(2) on frame 150(2) on a copy of the digital data that is independently sourced by the execution device from a second digital data source. These offsets may be of any desired length, such as byte offsets, sample offsets, etc. Alternatively, a system may use a presentation time, i.e., a unit of time in well-defined intervals (e.g., 100 nanosecond intervals). Elements such as byte offsets, sample offsets, presentation times, and/or other similar elements may allow each independently clocked execution device in a synchrony group to seek a particular frame start 155(f) for each frame 150(f) on a copy of the digital data that is independently sourced for retrieval and execution by each respective independently clocked execution device.

In one embodiment, source location information is stored in the source location field 145. The source location information specifies a location for a source of a frame 150(*f*) having samples 160(*f*)(*s*). For example, the source location information stored in source location field 145 may direct an execution device to seek digital data from a particular Internet domain address. The distribution device may copy and/or distribute data from a source location prior to sending out any offset information in order to allow the receiving execution device to connect to the source before seeking a particular offset from the source. Alternatively, the distribution device may distribute a source location at the same time or after copying and/or distributing offset information. Once an execution device receives the offset and source location information, it may seek and retrieve digital data for execution at a time indicated by the time stamp information in field 125. According to one embodiment, the source location field 145 may reflect a Universal Resource Indicator ("URI") such as a network address (e.g., IP address) as the location of a digital data source. According to another method, the source location field 145 may reflect a Universal Unique Identifier ("UUID") such as a media server as the location of digital data source. Additionally, the location of a digital data source as reflected in the source location field 145 may be distributed by a distribution device to an execution device using standard communication protocols, such as multicast streaming protocol.

In one exemplary method, a distribution device may receive a plurality of frames of digital data in WM DRM format from a digital data source. Collectively, all of these frames form a digital data payload, and may be contained within a single unit of measure called a "packet," such as an Advanced Systems Format ("ASF") packet. A typical ASF packet may comprise 5-6 kilobytes of digital data, which may represent a few hundred milliseconds of audio. In one exemplary embodiment, a distribution device may blank out the ASF packet of digital data in WM DRM format with 0x00 bytes. In an alternative embodiment, a distribution device may truncate the ASF packet in the sense that some or all of its trailing 0x00 bytes are removed. The distribution device may blank out and/or truncate a packet before or after it adds a frame header to a packet. In either case, the distribution device may blank out or truncate a packet before copying and/or distributing a corresponding frame header to an execution device. Once the frame header is received by the execution device, it may add or restore some or all of the 0x00 padding that was present on the packet before it was blanked out and/or truncated by the distribution device. The execution device may then reference a timestamp, a source location, and a digital data descriptor in the frame header. The digital data descriptor represents a file location, and within the file offset information may be found.

According to a further exemplary method, a distribution device may distribute some or all of the information in the frame header to two or more execution devices using a multicast protocol. The receiving execution devices may then:

a) insert the timestamp, source location and offset information into their respective caches;

b) look up the IP address of the digital data source by mapping the UUID to an IP address; and c) authorize themselves with the digital data source or authentication server if necessary (e.g., acquire a license), and seek and retrieve the digital data as specified by the frame header and buffer a portion of the digital data inside a socket buffer.

At the time the digital data is to be executed by the execution devices, each respective execution device may execute the buffered portion of the digital data from cache memory. In the event a new execution device subsequently joins the existing execution devices, a cache miss may occur. This may happen if the new device has not yet received the digital data. In this case, the new execution device may obtain the necessary information from the distribution device using an out-of-band HTTP transmission and then join the existing execution devices.

According to an even further exemplary method, each respective execution device may notify the distribution device via an out-of-band HTTP transaction that the respective execution device is prepared to initiate execution, in the event the distribution device can not determine how long it might take each execution device to acquire a license and buffer an adequate amount of digital data in cache memory. For the first in a series of tracks to be executed consecutively without delay, the distribution device may wait a certain bounded period of time until all execution devices have reported the completion of buffering. For the subsequent tracks, this waiting is not performed, since the track-to-track overlap is deemed a sufficient period of time.

Figure 2:
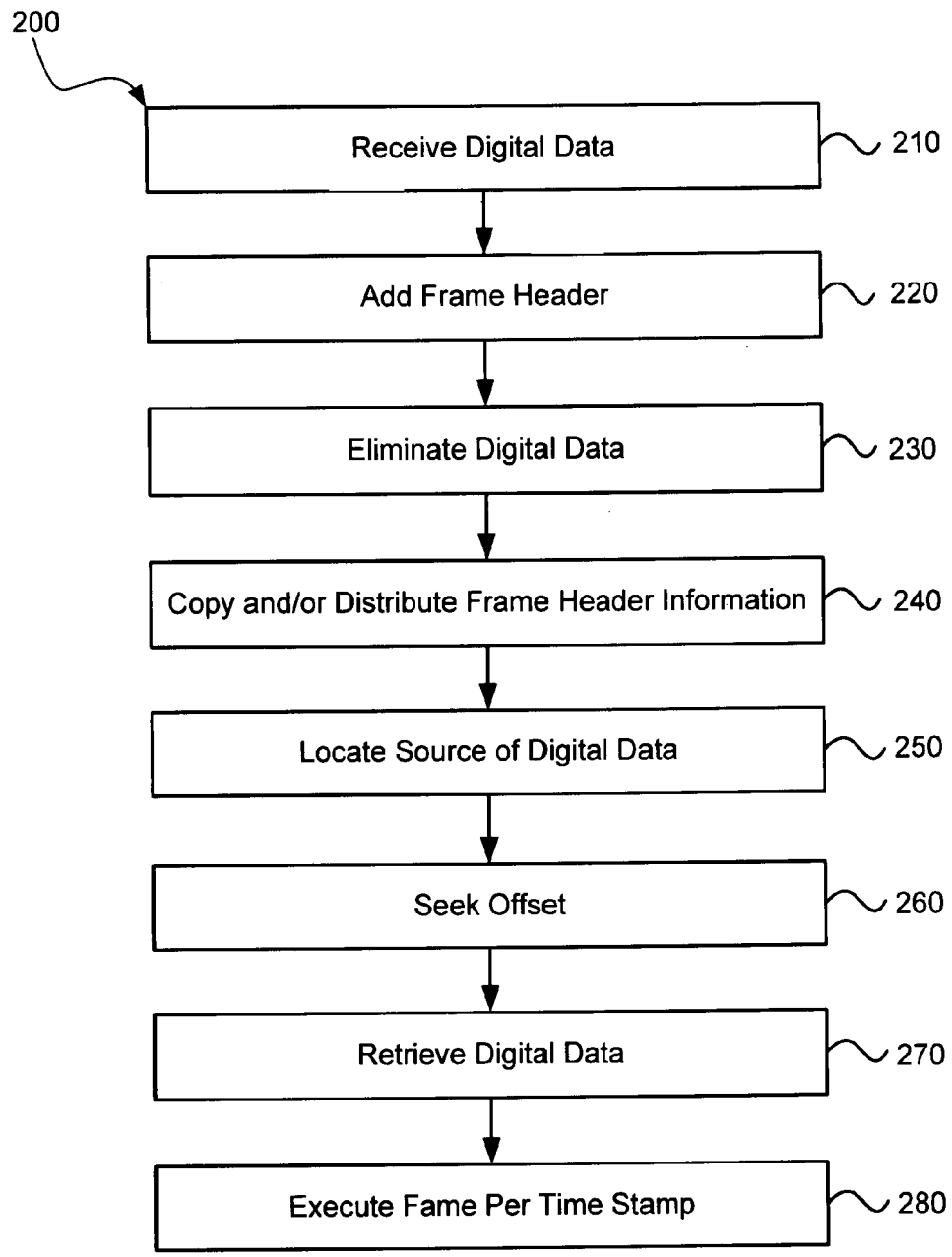
FIG. 2 is a flow chart of an exemplary process for synchronizing operations among a plurality of independently clocked digital data processing devices that independently source digital data.

FIG. 2 is a flow chart of an exemplary process 200 for synchronizing operations among a plurality of independently clocked digital data processing devices that independently source digital data.

At step 210, digital data is received by a distribution device. As described herein, digital data includes the frames 150(*f*) (FIG. 1) and corresponding samples 160(*f*)(*s*) (FIG. 1) received from a source of digital data, such as the Internet. In the case of systems operating with WM DRM or similar systems with forwarding restrictions, it may not be desirable or possible for a distribution device to copy and/or distribute received digital data. Accordingly, each execution device in a synchrony group may independently seek, retrieve and execute digital data based upon time stamp, offset and source location information provide by the distribution device.

At step 220, a frame header 105(*f*) (FIG. 1) is added to the received digital data. As discussed above and shown in FIG. 1, each frame header 105(*f*) may have a number of fields for storing various types of information, including a sequence number field 110, an encoding type field 115, a sampling rate field 120, a time stamp field 125, an end of frame field 130, a length field 135, an offset field 140, and a source location field 145.

At step 230, the received digital data is eliminated and/or rendered useless by the distribution device before the frame header 105(*f*) is copied and/or distributed to an execution device. According to some embodiments, a distribution device may blank out with 0x00 bytes an ASF data payload of exemplary frames originally encrypted with WM DRM.

At step 240, some or all of the information in the frame header 105(*f*) is copied and/or distributed by the distribution device. According to some embodiments, timestamp, offset and source location information is copied and/or distributed by the distribution device. The information in the various fields within the frame header may be copied and/or distributed at the same time or at different times. For example, the information in the source location field 145 may be copied and distributed by the distribution device before the distribution device copies and distributes the corresponding information in the offset field 140 and/or the timestamp field 125.

At step 250, an execution device receiving the distributed frame header information uses the information in the source location field 145 to locate a source of digital data. The source location information in the source location field 145 specifies a location for a source of frames **150(*f*) having samples 160(*f*)(*s*)**.

At step 260, after locating the source of digital data, the execution device may seek an offset specified in the offset field 140. For example, an execution device may use the information in the offset field 140 to seek a frame start **155(*f*) for a particular frame 150(*f*) as embodied on a copy of the digital data that is independently sourced from the digital data source identified during step 250**.

At step 270, the execution device retrieves the digital data corresponding to a particular offset provided by the distribution device.

At step 280, the execution device executes the retrieved digital data, and each execution device uses the information stored in the time stamp field 125 to execute the retrieved digital data at the same time or nearly at the same time as other execution devices in the synchrony group are executing the same digital data.

These techniques may allow for the accommodating of requirements associated with various digital data forms and formats such as WM DRM, which prohibits a single distribution device from providing the same digital data to some or all of the execution devices forming a synchrony group. Such techniques may also support execution devices that retrieve digital data for synchronous execution, by allowing some or all of the independently clocked execution devices to obtain a source location of digital data. Finally, multi-zone execution systems may be able to start execution simultaneously (with high probability), even in congested networks or in the event that a digital data source introduces variable delay in streaming the data. This avoids having devices start at various times, before they are synchronized.

While various embodiments have been described above, it should be understood that they have been presented by way of example only, and not limitation. Thus, the breadth and scope of a preferred embodiment should not be limited by any of the above-described exemplary embodiments.

The invention claimed is:

1. A method comprising:
receiving, by a first independently clocked execution device, an indication of a digital source location;
obtaining, by the first independently clocked execution device, audio content based on the digital source location, wherein the audio content comprises (i) a first sequence of digital frames and (ii) audio samples corresponding to each digital frame in the first sequence of digital frames;
receiving, from a second independently clocked execution device, timing information used to coordinate play back of the audio content in synchrony with the second independently clocked execution device, wherein the timing information comprises (i) a second sequence of digital frames, each digital frame in the first sequence of digital frames corresponding to a respective digital frame in the second sequence of digital frames, and (ii) a plurality of timestamps, each timestamp in the plurality of timestamps corresponding to a digital frame in the second sequence of digital frames of the audio content; and
reproducing the audio content by the first independently clocked execution device in synchrony with reproduction of the audio content by the second independently clocked execution device, wherein reproducing the audio content by the first independently clocked execution device in synchrony with reproduction of audio content by the second independently clocked execution device comprises:
executing, by the first independently clocked execution device, for each particular digital frame in the first sequence of digital frames of the obtained audio content, audio samples corresponding to the particular digital frame in the first sequence of digital frames of the obtained audio content according to the timestamp corresponding to the respective digital frame in the second sequence of digital frames of the received timing information, while the second independently clocked execution device independently executes the first sequence of digital frames of the audio content according to the plurality of time stamps.

2. The method of claim 1, wherein first independently clocked execution device is to continue to retrieve audio content from the digital data source based on the digital source location and an offset and to associate the retrieved audio content with subsequent timing information received in a subsequent message based on corresponding sequences of digital frames.

3. The method of claim 1, wherein a data forwarding restriction limits an ability for the first independently clocked execution device to provide the audio content to the second independently clocked execution device.

4. The method of claim 3, wherein the data forwarding restriction comprises digital rights management.

5. The method of claim 1, wherein obtaining, by the first independently clocked execution device, audio content based on the digital source location comprises obtaining the audio content in response to a request by the first independently clocked execution device.

6. The method of claim 1, wherein executing, by the first independently clocked execution device, for each particular digital frame in the first sequence of digital frames of the obtained audio content, audio samples corresponding to the particular digital frame in the first sequence of digital frames of the obtained audio content according to the timestamp corresponding to the respective digital frame in the second sequence of digital frames of the received timing information comprises executing, by the first independently clocked execution device, the audio samples relative to an external clock rate.

7. The method of claim 6, further comprising adjusting, by the first independently clocked execution device, a number of audio samples per digital frame of the first sequence of digital frames in relation to the external clock rate.

8. The method of claim 6, further comprising adjusting, by the first independently clocked execution device, a clock rate of the first independently clocked execution device in relation to the external clock rate.

9. The method of claim 1, further comprising adjusting the received timing information relative to a rate of change in an audio information buffer associated with the first independently clocked execution device, and wherein executing, by the first independently clocked execution device, for each particular digital frame in the first sequence of digital frames of the obtained audio content, audio samples corresponding to the particular digital frame in the first sequence of digital frames of the obtained audio content according to the timestamp corresponding to the respective digital frame in the second sequence of digital frames of the received timing information comprises executing, by the first independently clocked execution device, the audio samples relative to the rate of change.

10. The method of claim 1, wherein the first second independently clocked execution device is a master execution device configured to control distribution of audio content source location, offset, and timing information.

11. The method of claim 1, further comprising substituting a rate of change of an audio information buffer for the clock rate of the first independently clocked execution device.

12. The method of claim 1, further comprising adjusting at least one timestamp in the plurality of time stamps relative to a clock rate of the first independently clocked execution device.

13. The method of claim 1, wherein executing the audio samples according to the time stamp comprises:
executing the audio samples according to the time stamp relative to a clock rate of the first independently clocked execution device.

14. The method of claim 11, further comprising adjusting a clock rate of the first independently clocked execution device in relation to the rate of change in the audio information buffer.

15. The method of claim 11, further comprising adjusting a number of audio samples per digital frame of the audio content in relation to the rate of change in the audio information buffer.

16. A first independently clocked execution device comprising:
one or more processors; and
tangible, non-transitory computer-readable medium having stored thereon instructions that, when executed by the one or more processors, cause the first independently clocked execution device to perform functions comprising:
receiving, by the first independently clocked execution device, an indication of a digital source location;
obtaining, by the first independently clocked execution device, audio content based on the digital source location, wherein the audio content comprises (i) a first sequence of digital frames and (ii) audio samples corresponding to each digital frame in the first sequence of digital frames;
receiving, from a second independently clocked execution device, timing information used to coordinate play back of the audio content in synchrony with the second independently clocked execution device, wherein the timing information comprises (i) a second sequence of digital frames, each digital frame in the first sequence of digital frames corresponding to a respective digital frame in the second sequence of digital frames, and (ii) a plurality of timestamps, each timestamp in the plurality of timestamps corresponding to a digital frame in the second sequence of digital frames of the audio content; and
reproducing the audio content by the first independently clocked execution device in synchrony with reproduction of the audio content by the second independently clocked execution device, wherein reproducing the audio content by the first independently clocked execution device in synchrony with reproduction of audio content the second independently clocked execution device comprises:
executing, by the first independently clocked execution device, for each particular digital frame in the first sequence of digital frames of the obtained audio content, audio samples corresponding to the particular digital frame in the first sequence of digital frames of the obtained audio content according to the timestamp corresponding to the respective digital frame in the second sequence of digital frames of the received timing information, while the second independently clocked execution device independently executes the first sequence of digital frames of the audio content according to the plurality of time stamps.

17. The first independently clocked execution device of claim 16, wherein first independently clocked execution device is to continue to retrieve audio content from the digital data source based on the digital source location and an offset and to associate the retrieved audio content with subsequent timing information received in a subsequent message based on corresponding sequences of digital frames.

18. The first independently clocked execution device of claim 16, wherein executing, by the first independently clocked execution device, for each particular digital frame in the first sequence of digital frames of the obtained audio content, audio samples corresponding to the particular digital frame in the first sequence of digital frames of the obtained audio content according to the timestamp corresponding to the respective digital frame in the second sequence of digital frames of the received timing information comprises executing, by the first independently clocked execution device, the audio samples relative to an external clock rate.

19. Tangible, non-transitory computer-readable medium having stored thereon instructions that, when executed by one or more processors, cause a first independently clocked execution device to perform functions comprising:
receiving, by the first independently clocked execution device, an indication of a digital source location;
obtaining, by the first independently clocked execution device, audio content based on the digital source location, wherein the audio content comprises (i) a first sequence of digital frames and (ii) audio samples corresponding to each digital frame in the first sequence of digital frames;
receiving, from a second independently clocked execution device, timing information used to coordinate play back of the audio content in synchrony with the second independently clocked execution device, wherein the timing information comprises (i) a second sequence of digital frames, each digital frame in the first sequence of digital frames corresponding to a respective digital frame in the second sequence of digital frames, and (ii) a plurality of timestamps, each timestamp in the plurality of timestamps corresponding to a digital frame in the second sequence of digital frames of the audio content; and
reproducing the audio content by the first independently clocked execution device in synchrony with reproduction of the audio content by the second independently clocked execution device, wherein reproducing the audio content by the first independently clocked execution device in synchrony with reproduction of audio content the second independently clocked execution device comprises:
executing, by the first independently clocked execution device, for each particular digital frame in the first sequence of digital frames of the obtained audio content, audio samples corresponding to the particular digital frame in the first sequence of digital frames of the obtained audio content according to the timestamp corresponding to the respective digital frame in the second sequence of digital frames of the received timing information, while the second independently clocked execution device independently executes the first sequence of digital frames of the audio content according to the plurality of time stamps.

20. The tangible, non-transitory computer-readable medium of claim 19, wherein executing the audio samples according to the time stamp comprises:
   executing the audio samples according to the time stamp relative to a clock rate of the first independently clocked execution device.

\* \* \* \* \*